(12) United States Patent
Perdisci et al.

(10) Patent No.: US 9,948,671 B2
(45) Date of Patent: Apr. 17, 2018

(54) METHOD AND SYSTEM FOR NETWORK-BASED DETECTING OF MALWARE FROM BEHAVIORAL CLUSTERING

(71) Applicant: DAMBALLA, INC., Atlanta, GA (US)

(72) Inventors: Roberto Perdisci, Smyrna, GA (US); Wenke Lee, Atlanta, GA (US); Gunter Ollmann, Norcross, GA (US)

(73) Assignee: Damballa, Inc., Atlanta, GA (US)

( * ) Notice: Subject to any disclaimer, the term of this patent is extended or adjusted under 35 U.S.C. 154(b) by 0 days.

(21) Appl. No.: 14/317,785

(22) Filed: Jun. 27, 2014

(65) Prior Publication Data

US 2015/0026808 A1    Jan. 22, 2015

Related U.S. Application Data

(63) Continuation of application No. 13/008,257, filed on Jan. 18, 2011, now Pat. No. 8,826,438.

(60) Provisional application No. 61/296,288, filed on Jan. 19, 2010.

(51) Int. Cl.
  *G06F 21/00*  (2013.01)
  *H04L 29/06*  (2006.01)
  *G06F 21/56*  (2013.01)

(52) U.S. Cl.
  CPC ............ *H04L 63/145* (2013.01); *G06F 21/56* (2013.01); *H04L 63/1416* (2013.01); *H04L 63/1425* (2013.01)

(58) Field of Classification Search
  None
  See application file for complete search history.

(56) References Cited

U.S. PATENT DOCUMENTS

| | | |
|---|---|---|
| 4,843,540 A | 6/1989 | Stolfo |
| 4,860,201 A | 8/1989 | Stolfo et al. |
| 5,363,473 A | 11/1994 | Stolfo et al. |
| 5,497,486 A | 3/1996 | Stolfo et al. |
| 5,563,783 A | 10/1996 | Stolfo et al. |
| 5,668,897 A | 9/1997 | Stolfo |
| 5,717,915 A | 2/1998 | Stolfo et al. |

(Continued)

FOREIGN PATENT DOCUMENTS

| | | |
|---|---|---|
| WO | WO 02/37730 | 5/2002 |
| WO | WO 02/098100 | 12/2002 |
| WO | WO 2007/050244 | 5/2007 |

OTHER PUBLICATIONS

Gu, Guofei, BotMiner: Clustering Analysis of Network Traffic for Protocol-and Structure- Independent Bonet Detection, Aug. 2008, USENIX Association, 17th USENIX Security Symposium, pp. 139-154.*

(Continued)

*Primary Examiner* — Maung T Lwin
(74) *Attorney, Agent, or Firm* — Pepper Hamilton LLP

(57) ABSTRACT

A computerized system and method for performing behavioral clustering of malware samples, comprising: executing malware samples in a controlled computer environment for a predetermined time to obtain Hypertext Transfer Protocol. HTTP traffic; clustering the malware samples into at least one cluster based on network behavioral information from the HTTP traffic; and extracting, using the at least one processor, network signatures from the HTTP traffic information for each cluster, the network signatures being indicative of malware infection.

17 Claims, 10 Drawing Sheets

(56) References Cited

U.S. PATENT DOCUMENTS

| | | |
|---|---|---|
| 5,748,780 A | 5/1998 | Stolfo |
| 5,920,848 A | 7/1999 | Schultzer et al. |
| 6,401,118 B1 | 6/2002 | Thomas |
| 6,983,320 B1 | 1/2006 | Thomas et al. |
| 7,013,323 B1 | 3/2006 | Thomas et al. |
| 7,039,721 B1 | 5/2006 | Wu et al. |
| 7,043,759 B2 | 5/2006 | Kaaschoek et al. |
| 7,069,249 B2 | 6/2006 | Stolfo et al. |
| 7,093,292 B1 | 8/2006 | Pantuso |
| 7,136,932 B1 | 11/2006 | Schneider |
| 7,152,242 B2 | 12/2006 | Douglas |
| 7,162,741 B2 | 1/2007 | Eskin et al. |
| 7,185,368 B2 | 2/2007 | Copeland, III |
| 7,203,959 B2 | 4/2007 | Nachenberg et al. |
| 7,225,343 B1 | 5/2007 | Honig et al. |
| 7,277,961 B1 | 10/2007 | Smith et al. |
| 7,278,163 B2 | 10/2007 | Banzhof |
| 7,290,283 B2 | 10/2007 | Copeland, III |
| 7,331,060 B1 | 2/2008 | Ricciulli |
| 7,372,809 B2 | 5/2008 | Chen et al. |
| 7,383,577 B2 | 6/2008 | Hrastar et al. |
| 7,424,619 B1 | 9/2008 | Fan et al. |
| 7,426,576 B1 | 9/2008 | Banga et al. |
| 7,448,084 B1 | 11/2008 | Apap et al. |
| 7,475,426 B2 | 1/2009 | Copeland, III |
| 7,483,947 B2 | 1/2009 | Starbuck |
| 7,549,169 B1 | 1/2009 | Sobel et al. |
| 7,487,544 B2 | 2/2009 | Schultz et al. |
| 7,512,980 B2 | 3/2009 | Copeland, III et al. |
| 7,519,818 B2 | 4/2009 | Levin et al. |
| 7,519,994 B2 | 4/2009 | Judge et al. |
| 7,536,360 B2 | 5/2009 | Stolfo et al. |
| 7,634,808 B1 | 12/2009 | Szor |
| 7,639,714 B2 | 12/2009 | Stolfo et al. |
| 7,644,150 B1 | 1/2010 | Nucci et al. |
| 7,644,151 B2 | 1/2010 | Jerrim et al. |
| 7,657,935 B2 | 2/2010 | Stolfo et al. |
| 7,665,131 B2 | 2/2010 | Goodman |
| 7,698,442 B1 | 4/2010 | Krishnamurthy |
| 7,712,132 B1* | 5/2010 | Ogilvie ............... H04L 63/1408 726/22 |
| 7,712,134 B1* | 5/2010 | Nucci .................. H04L 63/145 713/172 |
| 7,752,125 B1 | 7/2010 | Kothari et al. |
| 7,752,665 B1 | 7/2010 | Robertson et al. |
| 7,779,463 B2 | 8/2010 | Stolfo et al. |
| 7,784,097 B1 | 8/2010 | Stolfo et al. |
| 7,809,670 B2* | 10/2010 | Lee ........................ G06F 21/564 706/59 |
| 7,818,797 B1 | 10/2010 | Fan et al. |
| 7,882,542 B2 | 2/2011 | Neystadt |
| 7,886,358 B2 | 2/2011 | Copeland, III |
| 7,890,627 B1 | 2/2011 | Thomas |
| 7,895,326 B2 | 2/2011 | Jerrim et al. |
| 7,913,306 B2 | 3/2011 | Apap et al. |
| 7,930,353 B2 | 4/2011 | Chickering |
| 7,962,798 B2 | 6/2011 | Locasto et al. |
| 7,979,907 B2 | 7/2011 | Schultz et al. |
| 7,996,288 B1 | 8/2011 | Stolfo |
| 8,015,414 B2 | 9/2011 | Mahone |
| 8,019,764 B1 | 9/2011 | Nucci |
| 8,065,722 B2 | 11/2011 | Barford et al. |
| 8,074,115 B2 | 12/2011 | Stolfo et al. |
| 8,161,130 B2 | 4/2012 | Stokes |
| 8,170,966 B1* | 5/2012 | Musat .................... H04L 12/585 706/14 |
| 8,180,916 B1 | 5/2012 | Nucci et al. |
| 8,200,761 B1* | 6/2012 | Tevanian ...................... 709/206 |
| 8,224,994 B1 | 7/2012 | Schneider |
| 8,260,914 B1 | 9/2012 | Ranjan |
| 8,341,745 B1 | 12/2012 | Chau |
| 8,347,394 B1 | 1/2013 | Lee |
| 8,402,543 B1 | 3/2013 | Ranjan et al. |
| 8,418,249 B1 | 4/2013 | Nucci et al. |
| 8,484,377 B1 | 7/2013 | Chen et al. |
| 8,516,585 B2 | 8/2013 | Cao et al. |
| 8,527,592 B2 | 9/2013 | Gabe |
| 8,631,489 B2 | 1/2014 | Antonakakis et al. |
| 8,667,583 B2 | 3/2014 | Polyakov et al. |
| 8,826,438 B2 | 9/2014 | Perdisci et al. |
| 8,832,829 B2 | 9/2014 | Manni et al. |
| 8,869,269 B1 | 10/2014 | Ramzan et al. |
| 9,516,058 B2 | 12/2016 | Antonakakis et al. |
| 9,525,699 B2 | 12/2016 | Antonakakis et al. |
| 2001/0014093 A1 | 8/2001 | Yoda et al. |
| 2001/0044785 A1 | 11/2001 | Stolfo et al. |
| 2001/0052007 A1 | 12/2001 | Shigezumi |
| 2001/0052016 A1 | 12/2001 | Skene et al. |
| 2001/0055299 A1 | 12/2001 | Kelly |
| 2002/0021703 A1 | 2/2002 | Tsuchiya et al. |
| 2002/0066034 A1 | 5/2002 | Schlossberg et al. |
| 2002/0166063 A1 | 11/2002 | Lachman et al. |
| 2002/0178238 A1 | 11/2002 | Fletcher et al. |
| 2003/0065926 A1 | 4/2003 | Schultz et al. |
| 2003/0065943 A1 | 4/2003 | Geis et al. |
| 2003/0069992 A1 | 4/2003 | Ramig |
| 2003/0145233 A1 | 7/2003 | Poletto et al. |
| 2003/0167308 A1 | 9/2003 | Schran |
| 2003/0167402 A1 | 9/2003 | Stolfo et al. |
| 2003/0204621 A1 | 10/2003 | Poletto et al. |
| 2003/0236995 A1 | 12/2003 | Fretwell, Jr. |
| 2004/0002903 A1 | 1/2004 | Stolfo et al. |
| 2004/0039798 A1 | 2/2004 | Hotz et al. |
| 2004/0044791 A1 | 3/2004 | Pouzzner |
| 2004/0088346 A1 | 5/2004 | Yeager |
| 2004/0088348 A1 | 5/2004 | Yeager |
| 2004/0111636 A1 | 6/2004 | Baffes et al. |
| 2004/0181687 A1* | 9/2004 | Nachenberg .......... G06F 21/567 726/30 |
| 2004/0187032 A1 | 9/2004 | Gels et al. |
| 2004/0205474 A1 | 10/2004 | Eskin et al. |
| 2004/0215972 A1 | 10/2004 | Sung et al. |
| 2005/0021848 A1 | 1/2005 | Jorgenson |
| 2005/0036501 A1 | 2/2005 | Chung et al. |
| 2005/0039019 A1 | 2/2005 | Delany |
| 2005/0044406 A1* | 2/2005 | Stute ..................... C12Q 1/6804 726/4 |
| 2005/0050377 A1 | 3/2005 | Chan et al. |
| 2005/0086523 A1 | 4/2005 | Zimmer et al. |
| 2005/0108407 A1 | 5/2005 | Johnson et al. |
| 2005/0108415 A1 | 5/2005 | Turk et al. |
| 2005/0210534 A1 | 9/2005 | Krishnamurthy |
| 2005/0257264 A1 | 11/2005 | Stolfo et al. |
| 2005/0261943 A1 | 11/2005 | Quarterman et al. |
| 2005/0265331 A1 | 12/2005 | Stolfo |
| 2005/0278540 A1 | 12/2005 | Cho |
| 2005/0281291 A1 | 12/2005 | Stolfo et al. |
| 2006/0015630 A1 | 1/2006 | Stolfo et al. |
| 2006/0015722 A1 | 1/2006 | Rowan et al. |
| 2006/0026682 A1 | 2/2006 | Zakas |
| 2006/0031483 A1 | 2/2006 | Lund |
| 2006/0067240 A1 | 3/2006 | Kim et al. |
| 2006/0068806 A1 | 3/2006 | Nam |
| 2006/0075084 A1 | 4/2006 | Lyon |
| 2006/0075494 A1 | 4/2006 | Beaman et al. |
| 2006/0078096 A1 | 4/2006 | Poyhonen |
| 2006/0143711 A1 | 6/2006 | Huang et al. |
| 2006/0146816 A1 | 7/2006 | Jain |
| 2006/0150249 A1 | 7/2006 | Gassen et al. |
| 2006/0156402 A1 | 7/2006 | Stone et al. |
| 2006/0168024 A1 | 7/2006 | Mehr |
| 2006/0174345 A1* | 8/2006 | Flanagan ............... G06F 21/554 726/24 |
| 2006/0176822 A1 | 8/2006 | Doyle et al. |
| 2006/0178994 A1 | 8/2006 | Stolfo et al. |
| 2006/0200539 A1 | 9/2006 | Kappler et al. |
| 2006/0212925 A1 | 9/2006 | Shull et al. |
| 2006/0212942 A1* | 9/2006 | Barford ............... H04L 63/1416 726/24 |
| 2006/0224677 A1 | 10/2006 | Ishikawa et al. |
| 2006/0230039 A1 | 10/2006 | Shull |
| 2006/0247982 A1 | 11/2006 | Stolfo et al. |
| 2006/0253581 A1 | 11/2006 | Dixon |
| 2006/0253584 A1 | 11/2006 | Dixon |

(56) References Cited

U.S. PATENT DOCUMENTS

| | | |
|---|---|---|
| 2006/0259967 A1 | 11/2006 | Thomas et al. |
| 2006/0265436 A1 | 11/2006 | Edmond |
| 2006/0288415 A1* | 12/2006 | Wong ............... H04L 63/145 726/24 |
| 2007/0050708 A1 | 3/2007 | Gupta et al. |
| 2007/0056038 A1 | 3/2007 | Lok |
| 2007/0064617 A1 | 3/2007 | Reves |
| 2007/0076606 A1 | 4/2007 | Olesinski |
| 2007/0083931 A1 | 4/2007 | Spiegel |
| 2007/0118669 A1 | 5/2007 | Rand et al. |
| 2007/0136455 A1* | 6/2007 | Lee et al. ............... 709/223 |
| 2007/0162587 A1 | 7/2007 | Lund et al. |
| 2007/0198679 A1* | 8/2007 | Duyanovich ....... G06F 11/3409 709/223 |
| 2007/0209074 A1 | 9/2007 | Coffman |
| 2007/0239999 A1 | 10/2007 | Honig et al. |
| 2007/0253377 A1 | 11/2007 | Janneteau et al. |
| 2007/0274312 A1 | 11/2007 | Salmela et al. |
| 2007/0294339 A1 | 12/2007 | Ala-Kleemola et al. |
| 2007/0294419 A1 | 12/2007 | Ulevitch |
| 2008/0005555 A1 | 1/2008 | Lotem et al. |
| 2008/0016570 A1 | 1/2008 | Capalik |
| 2008/0028073 A1 | 1/2008 | Trabe et al. |
| 2008/0028463 A1 | 1/2008 | Dagon |
| 2008/0060054 A1 | 3/2008 | Srivastava |
| 2008/0060071 A1 | 3/2008 | Hennan |
| 2008/0098476 A1 | 4/2008 | Syversen |
| 2008/0133300 A1 | 6/2008 | Jalinous |
| 2008/0155694 A1 | 6/2008 | Kwon et al. |
| 2008/0177736 A1 | 7/2008 | Spangler |
| 2008/0177755 A1 | 7/2008 | Stern et al. |
| 2008/0178293 A1 | 7/2008 | Keen et al. |
| 2008/0184371 A1* | 7/2008 | Moskovitch et al. .......... 726/24 |
| 2008/0195369 A1* | 8/2008 | Duyanovich ....... G06F 11/0709 703/22 |
| 2008/0201779 A1* | 8/2008 | Tahan ............... G06F 21/564 726/23 |
| 2008/0222729 A1 | 9/2008 | Chen et al. |
| 2008/0229415 A1 | 9/2008 | Kapoor |
| 2008/0262985 A1 | 10/2008 | Cretu et al. |
| 2008/0263659 A1 | 10/2008 | Alme |
| 2008/0276111 A1 | 11/2008 | Jocoby et al. |
| 2009/0055929 A1 | 2/2009 | Lee et al. |
| 2009/0083855 A1 | 3/2009 | Apap et al. |
| 2009/0106304 A1 | 4/2009 | Song |
| 2009/0138590 A1 | 5/2009 | Lee et al. |
| 2009/0171871 A1* | 7/2009 | Zhang ............... G06F 19/345 706/12 |
| 2009/0193293 A1 | 7/2009 | Stolfo et al. |
| 2009/0198997 A1 | 8/2009 | Yeap |
| 2009/0210417 A1 | 8/2009 | Bennett |
| 2009/0222922 A1 | 9/2009 | Sidiroglou et al. |
| 2009/0241190 A1 | 9/2009 | Todd et al. |
| 2009/0241191 A1 | 9/2009 | Keromytis et al. |
| 2009/0254658 A1 | 10/2009 | Kamikura et al. |
| 2009/0254989 A1 | 10/2009 | Achan et al. |
| 2009/0254992 A1 | 10/2009 | Schultz et al. |
| 2009/0265777 A1 | 10/2009 | Scott |
| 2009/0282479 A1 | 11/2009 | Smith et al. |
| 2009/0327487 A1 | 12/2009 | Olson et al. |
| 2010/0011243 A1 | 1/2010 | Locasto et al. |
| 2010/0011420 A1 | 1/2010 | Drako |
| 2010/0017487 A1* | 1/2010 | Patinkin ............... 709/206 |
| 2010/0023810 A1 | 1/2010 | Stolfo et al. |
| 2010/0031358 A1 | 2/2010 | Elovici et al. |
| 2010/0034109 A1 | 2/2010 | Shomura et al. |
| 2010/0037314 A1 | 2/2010 | Perdisci et al. |
| 2010/0043047 A1* | 2/2010 | Archer ............... H04L 63/1416 726/1 |
| 2010/0054278 A1 | 3/2010 | Stolfo et al. |
| 2010/0064368 A1 | 3/2010 | Stolfo et al. |
| 2010/0064369 A1 | 3/2010 | Stolfo et al. |
| 2010/0071068 A1 | 3/2010 | Bauschert et al. |
| 2010/0077481 A1* | 3/2010 | Polyakov ............... G06F 21/568 726/24 |
| 2010/0077483 A1 | 3/2010 | Stolfo et al. |
| 2010/0082758 A1 | 4/2010 | Golan |
| 2010/0138919 A1 | 6/2010 | Peng |
| 2010/0146615 A1 | 6/2010 | Locasto et al. |
| 2010/0153785 A1 | 6/2010 | Keromytis et al. |
| 2010/0169970 A1 | 7/2010 | Stolfo et al. |
| 2010/0235915 A1 | 9/2010 | Memon et al. |
| 2010/0269175 A1 | 10/2010 | Stolfo et al. |
| 2010/0274970 A1 | 10/2010 | Treuhaft et al. |
| 2010/0275263 A1 | 10/2010 | Bennett et al. |
| 2010/0281539 A1 | 11/2010 | Burns et al. |
| 2010/0281541 A1 | 11/2010 | Stolfo et al. |
| 2010/0281542 A1 | 11/2010 | Stolfo et al. |
| 2010/0319069 A1 | 12/2010 | Granstedt |
| 2010/0332680 A1 | 12/2010 | Anderson et al. |
| 2011/0040706 A1 | 2/2011 | Sen et al. |
| 2011/0041179 A1 | 2/2011 | Stahlberg |
| 2011/0055123 A1 | 3/2011 | Kennedy |
| 2011/0067106 A1 | 3/2011 | Evans et al. |
| 2011/0167493 A1 | 7/2011 | Song et al. |
| 2011/0167494 A1 | 7/2011 | Bowen et al. |
| 2011/0185423 A1 | 7/2011 | Sallam |
| 2011/0185428 A1 | 7/2011 | Sallam |
| 2011/0214161 A1 | 9/2011 | Stolfo et al. |
| 2012/0079101 A1 | 3/2012 | Muppala et al. |
| 2012/0084860 A1 | 4/2012 | Cao et al. |
| 2012/0102568 A1 | 4/2012 | Tarbotton et al. |
| 2012/0117641 A1 | 5/2012 | Holloway |
| 2012/0143650 A1 | 6/2012 | Crowley et al. |
| 2012/0151585 A1 | 6/2012 | Lamastra et al. |
| 2012/0198549 A1 | 8/2012 | Antonakakis |
| 2012/0215909 A1 | 8/2012 | Goldfarb et al. |
| 2013/0054802 A1 | 2/2013 | Donzis et al. |
| 2013/0174253 A1 | 7/2013 | Thomas et al. |
| 2013/0232574 A1 | 9/2013 | Carothers |
| 2014/0068763 A1 | 3/2014 | Ward et al. |
| 2014/0068775 A1 | 3/2014 | Ward et al. |
| 2014/0075558 A1 | 3/2014 | Ward et al. |
| 2014/0090058 A1 | 3/2014 | Ward et al. |
| 2014/0289854 A1 | 9/2014 | Mahvi |
| 2016/0156660 A1 | 6/2016 | Dagon et al. |
| 2016/0285894 A1 | 9/2016 | Nelms et al. |

OTHER PUBLICATIONS

Cliff Changchun Zou et al., "Code Red Worm Propagation Modeling and Analysis", In Proceedings of 9th ACM Conference on Computer and Communications Security (CCS '02), Nov. 18, 2002.

Cliff C. Zou et al,. "Email Worm Modeling and Defense", In the 13th ACM International Conference on Computer Communications and Networks (CCCN '04), Oct. 27, 2004.

Cliff Changchun Zou et al., "Monitoring and Early Warning for Internet Worms", In Proceedings fo the 10th ACM Conference on Computer and Communications Security (CCS '03), Oct. 2003.

Cliff Changchun Zou et al., "On the Performance of Internet Worm Scanning Strategies", Technical Report TR-03-CSE-07, Umass ECE Dept., Nov. 2003.

Alexander Gostev, "Malware Elovution: Jan.-Mar. 2005", Viruslist. com, http://www.viruslist.com/en/analysis?pubid=162454316, (Apr. 18, 2005).

Jiang Wu et al., "An Effective Architecture and Algorithm for Detecting Worms with Various Scan Techniques", In Proceedings of the 11th Annual Network and Distributed System Security Symposium (NDSS '04), Feb. 2004.

Matthew M. Williamson et al., "Virus Throttling for Instant Messaging", Virus Bulletin Conference, Sep. 2004, Chicago, IL, USA, (Sep. 2004).

F. Weimer, "Passive DNS Replication", http://www.enyo.de/fw/software/dnslogger, 2005.

Ke Wang et al., "Anomalous Payload-Based Network Intrusion Detection", In Proceedings of the 7th International Symposium on Recent Advances in Intrusion Detection (RAID 2004), 2004.

P. Vixie et al,. "RFC 2136: Dynamic Updates in the Domain Name System (DNS Update)", http://www.faqs.org/rfcs.rfc2136.html (Apr. 1997).

(56) References Cited

OTHER PUBLICATIONS

Joe Stewart, "Dipnet/Oddbob Worm Analysis", SecureWorks, http://www.secureworks.com/research/threats/dipnet/ (Jan. 13, 2005).
Harold Thimbleby et al., "A Framework for Modeling Trojans and Computer Virus Infection", Computer Journal, vol. 41, No. 7, pp. 444-458 (1999).
Paul Bachner et al., "Know Your Enemy: Tracking Botnets", http://www.honeynet.org/papers/bots/, (Mar. 13, 2005).
"LockDown Security Bulletin—Sep. 23, 2001", http://lockdowncorp.com/bots/ (Sep. 23, 2001).
Colleen Shannon et al., "The Spread of the Witty Worm", http://www.caida.org/analysis/security/witty/index.xml (Mar. 19, 2004).
Moheeb Abu Rajab et al., "On the Effectiveness of Distributed Worm Monitoring", In Proceedings fo the 14th USENIX Security Symposium (2005).
Niels Provos, "CITI Technical Report 03-1: A Virtual Honeypot Framework", http://www.citi.umich.edu/techreports/reports/citi-tr-03-1.pdf (Oct. 21, 2003).
"Know your Enemy: Honeynets", http://www.honeypot.org/papers/honeynet, (May 31, 2006).
David Moore et al., "Internet Quarantine: Requirements for Containing Self-Propagating Code", In Proceedings of the IEEE INFOCOM 2003, Mar. 2003.
Joe Stewart, "I-Worm Baba Analysis", http://secureworks.com/research/threats/baba (Oct. 22, 2004.
David Moore et al., "Slammer Worm Dissection: Inside the Slammer Worm", IEEE Security & Privacy, vol. 1, No. 4 (Jul.-Aug. 2003).
David Moore et al., "Code-Red: A Case Study on the Spread and Victims of an Internet Worm", http://www.icir.org/vern/imw-2002/imw2002-papers/209.ps/gz (2002).
Joe Stewart, "Sinit P2P Trojan Analysis", http://www.secureworks.com/research/threats/sinit, (Dec. 8, 2003).
Martin Krzywinski, "Port Knocking—Network Authentication Across Closed Ports", Sys Admin Magazine, vol. 12, pp. 12-17 (2003).
Christopher Kruegel et al., "Anomaly Detection of Web-Based Attacks", In Proceedings of the 10th ACM Conference on Computer and Communication Security (CCS '03), Oct. 27-31, 2003, Washington, DC, USA, pp. 251-261.
"Dabber Worm Analysis", LURHQ Threat Intelligence Group, http://www.lurhq.com/dabber.html (May 13, 2004).
Abstract of Jeffrey O. Kephart et al,. "Directed-Graph Epidemiological Models of Computer Viruses", Proceedings of the 1991 IEEE Computer Society Symposium on Research in Security and Privacy; Oakland, CA, May 20-22, 1991; pp. 343-359 (May 20-22, 1991).
C. Kalt "RFC 2810—Internet Relay Chat: Architecture" http://faqs.org/rfcs/rfc2810.html (Apr. 2010).
Xuxian Jiang et al., "Cerias Tech Report 2005-24: Virtual Playgrounds for Worm Behavior Investigation", Purdue University, Feb. 2005.
Neal Hindocha et al., "Malicious Threats and Vulnerabilities in Instant Messaging", Virus Bulletin International Conference, Sep. 2003.
Thomer M. Gil, "NSTX (IP-over-DNS) HOWTO", http://thomer.com/howtos/nstx.html, Nov. 4, 2005 (5 pages).
V. Fuller et al., "RFC 1519—Classless Inter-Domain Routing (CIDR): An Address Assignment and Aggregation Strategy", http://www.faqs.org/rfcs/rfc1519.html (Sep. 1993).
David E. Smith "Dynamic DNS", http://www.technopagan.org/dynamic (Aug. 7, 2006).
Dave Dittrich, "Active Response Continuum Research Project", http://staff.washington.edu/dittrich/arc/ (Nov. 14, 2005).
Joe Stewart, "Akak Trojan Analysis", http://www.secureworks.com/research/threats/akak/ (Aug. 31, 2004).
Monirul I. Sharif, "Mechanisms of Dynamic Analysis and DSTRACE".
Kapil Kumar Singh, "IRC Reconnaissance (IRCRecon) Public IRC Heuristics (BotSniffer)" (Jul. 24, 2006).
"2006 Press Releases: Trend Micro Takes Unprecedented Approach to Eliminating Botnet Threats with the Unveiling of InterCloud Security Service", http://www.trendmicro.com/en/about/news/pr/archive/2006/pr092506.htm, (Sep. 25, 2006).
Paul F. Roberts, "Trend Micro Launches Anti-Botnet Service", InfoWorld, http://www.infoworld.com/article/06/09/25/HNtrendintercloud_1.html (Sep. 25, 2006).
CNN Technology News—Expert: Botnets No. 1 Emerging Internet Threat, CNN.com, http://www.cnn.com/2006/TECH/internet/01/31/furst.index.html (Jan. 31, 2006).
Evan Cooke et al., "The Zombie Roundup: Understanding, Detecting, and Disrupting Botnets", In USENIX Workshop on Steps to Reducing Unwanted Traffic on the Internet (SRUTI), Jun. 2005.
Sven Dietrich et al., "Analyzing Distributed Denial of Service Tools: The Shaft Case", Proceedings of the 14th Systems Administration Conference (LISA 2000), New Orleans, Louisiana, USA, Dec. 3-8, 2000.
Felix C. Freiling et al,. "Botnet Tracking: Exploring a Root-Cause Methodology to Prevent Distributed Denial-of-Service Attacks", ESORICS 2005, LNCS 3679, pp. 319-335 (2005).
Luiz Henrique Gomes et al,. "Characterizing a Spam Traffic", In Proc. ACM SIGCOMM Internet Measurement Conference (IMC '04), Oct. 25-27, 2004 Taormina, Sicily, Italy, pp. 356-369.
Christopher W. Hanna, "Using Snort to Detect Rogue IRC Bot Programs", Technical Report, SANS Institute 2004 (Oct. 8, 2004).
Jaeyeon Jung et al., "An Empirical Study of Spam Traffic and the Use of DNS Black Lists", In Proc. ACM SIGCOMM Internet Measurement Conference (IMC '04), Oct. 25-27, 2004, Taormina, Sicily, Italy, pp. 370-375.
Srikanth Kandula et al., "Botz-4-Sale: Surviving Organized DDoS Attacks That Mimic Flash Crowds", Technical Report LCS TR-969, Laboratory for Computer Science, MIT, 2004.
Sven Krasser et al., "Real-Time and Forensic Network Data Analysis Using Animated and Coordinated Visualization", Proceedings of the 6th IEEE Information Assurance Workshop (Jun. 2005).
David Moore et al., "Inferring Internet Denial-of-Service Activity", In Proceedings of the 2001 USENIX Security Symposium, 2001.
Stephane Racine, "Master's Thesis: Analysis for Internet Relay Chat Usage by DDoS Zombies", ftp://www.tik.ee.ethz.ch/pub/students/2003-2004-Wi/MA-2004-01.pdf (Nov. 3, 2003).
Anirudh Ramachandran et al., "Understanding the Network-Level Behavior of Spammers", SIGCOMM '06, Sep. 11-15, 2006, Pisa, Italy, pp. 291-302.
Ramneek Puri, "Bots & Botnet: An Overview", SANS Institute 2003, http://www.giac.com/practical/GSEC/Ramneek_Puri_GSEC.pdf (Aug. 8, 2003).
Stuart E. Schechter et al., "Access for Sale: A New Class of Worm", In 2003 ACM Workshop on Rapid Malcode (WORM '03), ACM SIGSAC, Oct. 27, 2003, Washington, DC, USA.
Stuart Staniford, "How to Own the Internet in Your Spare Time", In Proc. 11th USENIX Security Symposium, San Francisco, CA, Aug. 2002.
Martin Overton, "Bots and Botnets: Risks, Issues and Prevention", 2005 Virus Bulletin Conference at the Burlington, Dublin, Ireland, Oct. 5-7, 2005, http://arachnid.homeip.net/papers/VB2005-Bots_and_Botnets-1.0.2.pdf.
Yin Zhang et al., "Detecting Stepping Stones", Proceedings of the 9th USENIX Security Symposium, Denver, Colorado, USA, Aug. 14-17, 2000.
Joe Stewart, "Bobax Trojan Analysis", http://www.lurhq.com/bobax.html, May 17, 2004.
David Brumley et al., "Tracking Hackers on IRC", http://www.doomded.com/texts/ircmirc/TrackingHackersonIRC.htm, Dec. 8, 1999.
Brian Krebs, "Bringing Botnets Out of the Shadows", Washingtonpost.com, http://www.washingtonpost.com/wp-dyn/content/artcile/2006/03/21/AR2006032100279_pf.html, Mar. 21, 2006.
"SwatIT: Bots, Drones, Zombies, Worms and Other Things That Go Bump in the Night", http://swatit.org/bots, 2004.

(56) References Cited

OTHER PUBLICATIONS

Christian Kreibich, "Honeycomb: Automated NIDS Signature Creation Using Honeypots", 2003, http://www.cl.cam.ac.uk/research/srg/netos/papers/2003-honeycomb-sigcomm-poster.pdf.
DMOZ Open Directory Project, Dynamic DNS Providers List, http://dmoz.org/Computers/Software/Internet/Servers/Address_Management/Dynamic_DNS_Services/, (downloaded for review, 2015).
David Moore, "Network Telescopes: Observing Small or Distant Security Events", http://www.caida.org/publications/presentations/2002/usenix_sec/usenix_sec_2002_files/frame.htm; Aug. 8, 2002.
Vincent H. Berk et al., "Using Sensor Networks and Data Fusion for Early Detection of Active Worms", Sensors, and Command, Control, Communications, and Intelligence (C3il) Technologies for Homeland Defense and Law Enforcement II, Proceedings of SPIE, vol. 5071, pp. 92-104 (2003).
David Dagon et al., "Worm Population Control Through Periodic Response", Technical Report, Georgia Institute for Technology, Jun. 2004.
Scott Jones et al., "The IPM Model of Computer Virus Management", Computers & Security, vol. 9, pp. 411-418 (1990).
Jeffrey O. Kephart et al., "Directed-Graph Epidemiological Models of Computer Viruses", In Proceedings of IEEE Symposium on Security and Privacy, pp. 343-359 (1991).
Darrell M. Kienzle et al., "Recent Worms: A Survey and Trends", In WORM '03, Proceedings of the 2003 ACM Workshop on Rapid Malcode, Washington, DC, USA, pp. 1-10, Oct. 27, 2003.
Bill McCarty, "Botnets: Big and Bigger", IEEE Security and Privacy Magazine, vol. 1, pp. 87-89 (2003).
Xinzhou Qin et al., "Worm Detection Using Local Networks", Technical Report GIT-CC-04-04, College of Computing, Georgia Institute of Technology, Feb. 2004.
Yang Wang et al., "Modeling the Effects of Timing Parameters on Virus Propagation", In Proceedings of ACM CCS Workshop on Rapid Malcode (WORM '03), Washington, DC, pp. 61-66, Oct. 27, 2003.
Donald J. Welch et al., "Strike Back: Offensive Actions in Information Warfare", in AMC New Security Paradigm Workshop, pp. 47-52 (1999).
T. Liston, "Welcome to my Tarpit: The Tactical and Stragetic Use of LaBrea", http://www.hackbusters.net/LaBrea/LaBrea.txt, Oct. 24, 2001.
R. Pointer, "Eggdrop Development", http://www.eggheads.org, Oct. 1, 2005.
Staniford, "Code Red Analysis Pages: July Infestation Analysis", http://silicondefense.org/cr/july.html, Nov. 18, 2001.
Alex Ma, "NetGeo—The Internet Geographic Database", http://www.caida.org/tools/utilities/netgeo/index.xml, Sep. 6, 2006.
MathWorks Inc. Simulink, http://www.mathworks.com/products/simulink, Dec. 31, 2005.
David Dagon et al., "Modeling Botnet Propagation Using Time Zones", In Proceedings of the 13th Annual Network and Distributed Systems Security Symposium (NDSS '06), Feb. 2006.
John Canavan, "Symantec Security Response: W32.Bobax.D", http://www.sarc.com/avcent/venc/data/w32.bobax.d.html, May 26, 2004.
"Whois Privacy", www.gnso.icann.org/issues/whois-privacy/index/shtml, Jun. 3, 2005.
John D. Hardin, "The Scanner Tarpit HOWTO", http://www.impsec.org/linus/security/scanner-tarpit.html, Jul. 20, 2002.
Charles J. Krebs, "Ecological Methodology", Harper & Row, Publishers, New York, pp. v-x, 15-37, 155-166, and 190-194 (1989).
D.J. Daley et al., "Epidemic Modeling: An Introduction", Cambridge University Press, pp. vii-ix, 7-15, and 27-38 (1999).
Lance Spitzner, "Honeypots: Tracking Hackers", Addison-Wesley, pp. vii-xiv, 73139, 141-166, and 229-276 (2003).
International Search Report issued in Application No. PCT/US06/038611 dated Jul. 8, 2008.
Written Opinion issued in Application No. PCT/US06/038611 dated Jul. 8, 2008.

International Preliminary Report on Patentability issued in Application No. PCT/US06/038611 dated Mar. 26, 2009.
O. Diekmann et al,. "Mathematical Epidemiology of Infectious Diseases: Model Building, Analysis and Interpretation", John Wiley & Son, Ltd., 2000, pp. v-xv and 1-303.
Jelena Mirkovic et al,. "Internet Denial of Service: Attack and Defense Mechanisms", Prentice Hall Professional Technical Reference, 2004, pp. v-xxii and 1-372.
"Symantec Internet Security Threat Report: Trends for Jan. 1, 2004-Jun. 30, 2004" Symantec, Sep. 2004, pp. 1-54.
David Dagon et al., "HoneyStat: Local Worm Detection Using Honeypots", RAID 2004, LNCS 3224, pp. 39-58 (2004).
Jonghyun Kim et al., "Measurement and Analysis of Worm Propagation on Internet Network Topology", IEEE, pp. 495-500 (2004).
Andreas Marx, "Outbreak Response Times: Putting AV to the Test", www.virusbtn.com, Feb. 2004, pp. 4-6.
Vinod Yegneswaran et al., "Global Intrusion Detection in the DOMINO Overlay System", Proceedings of Network and Distributed Security Symposium (NDSS), 17 pages Feb. 2004.
Vinod Yegneswaran et al., "On the Design and Use of Internet Sinks for Network Abuse Monitoring", RAID 2004, LNCS 3224, pp. 146-165 (2004).
Cliff Changchun Zou et al., "Worm Propagation Modeling and Analysis Under Dynamic Quarantine Defense", WORM'03, Oct. 27, 2003, Washington, DC USA, 10 pages.
Cliff C. Zou et al., "Routing Worm: A Fast, Selective Attack Worm Based on IP Address Information", Technical Report: TR-03-CSE-06, Principles of Advanced and Distributed Simulation (PADS) 2005, pp. 199-206, Jun. 1-3, 2005.
Thorsten Holz, "Anti-Honeypot Technology", 21st Chaos Communication Congress, slides 1-57, Dec. 2004.
"CipherTrust's Zombie Stats", http://www.ciphertrust.com/resources/statistics/zombie.php 3 pages, printed Mar. 25, 2009.
Joe Stewart, "Phatbot Trojan Analysis", http://www.secureworks.com/research/threats/phatbot, Mar. 15, 2004, 3 pages.
Thorsten Holz et al., "A Short Visit to the Bot Zoo", IEEE Security & Privacy, pp. 7679 (2005).
Michael Glenn, "A Summary of DoS/DDoS Prevention, Monitoring and Mitigation Techniques in a Service Provider Environment", SANS Institute 2003, Aug. 21, 2003, pp. ii-iv, and 1-30.
Dennis Fisher, "Thwarting the Zombies", Mar. 31, 2003, 2 pages.
Dongeun Kim et al., "Request Rate Adaptive Dispatching Architecture for Scalable Internet Server", Proceedings of the IEEE International Conference on Cluster Computing (CLUSTER'00); pp. 289-296 (2000).
Keisuke Ishibashi et al., "Detecting Mass-Mailing Worm Infected Hosts by Mining DNS Traffic Data", SIGCOMM'05 Workshops, pp. 159-164 (Aug. 22-26, 2005).
Nicholas Weaver et al., "A Taxonomy of Computer Worms", WORM'03, pp. 11-18 (Oct. 27, 2003).
Stephan Axelsson, "The Base-Rate Fallacy and the Difficulty of Intrusion Detection", ACM Transactions on Information and System Security, vol. 3, No. 3, pp. 186-205 (Aug. 2000).
Niel Landwehr et al., "Logistic Model Trees", Machine Learning, vol. 59, pp. 161-205 (2005).
Richard O. Duda et al., "Pattern Classification, Second Edition", John Wiley & Sons, Inc., pp. vii-xx, and 1-654, Copyright 2001.
Guofei Gu et al. "BotMiner: Clustering Analysis of Network Traffic Protocol- and Structure-Independent Botnet Detection", 2008, USENIX Security Symposium, pp. 139-154.
Zhu et al., "Using Failure Information Analysis to Detect Enterprise Zombies," Lecture note of the Institute for Computer Science, Social-Informatics and Telecommunications Engineering, vol. 19, part 4, pp. 185-206, 2009.
Manos Antonakakis et al., "Building a Dynamic Reputation System for DNS", 19th USENIX Security Symposium, Aug. 11-13, 2010 (17 pages).
Manos Antonakakis et al., "Detecting Malware Domains at the Upper DNS Hierarchy", In Proceeding of the 20th USENIX Security Symposium, Aug. 8-12, 2011 (16 pages).
Leyla Bilge et al., "EXPOSURE: Finding Malicious Domains Using Passive DNS Analysis", 18th Annual Network and Distributed System Security Symposium, Feb. 6-9, 2011 (17 pages).

(56) References Cited

OTHER PUBLICATIONS

"Virus:Win32/Expiro.Z". http://www.microsoft.com/security/portal/Threat/Encyclopedia/Entry.aspx, Jun. 9, 2011 (5pages).

Mike Geide, "Another Trojan Bamital Pattern", http://research.zscaler.com/2011/05/another-trojan-bamital-pattern.html, May 6, 2011 (5 pages).

Sergey Golovanov et al., "TDL4—Top Bot", http://www.secuirlist.com/en/analysis/204792180/TDL4_Top_Bot, Jun. 27, 2011 (15 pages).

P. Mockapetris, "Domain Names—Concepts and Facilities", Network Working Group, http://www.ietf.org/rfc/rfc1034.txt, Nov. 1987 (52 pages).

P. Mockapetris, "Domain Names—Implementation and Specification", Network Working Group, http://www.ietf.org/rfc/rfc1035.txt, Nov. 1987 (52 pages).

Phillip Porras et al. "SRI International Technical Report: An Analysis of Conficker's Logic and Rendezvous Points", http://mtc.sri.com/Conficker/, Mar. 19, 2009, (31 pages).

Phillip Porras et al. "SRI International Technical Report: Conficker C Analysis", http://mtc.sri.com/Conficker/addendumC, Apr. 4, 2009, (24 pages).

Paul Royal, Damballa, "Analysis of the Kracken Botnet", Apr. 9, 2008 (13 pages).

Sergei Shevchenko, "Srizbi's Domain Calculator", http://blog.threatexpert.com/2008/11/srizbix-domain-calculator.html, Nov. 28, 2008 (3 pages).

Sergei Shevchenko, "Domain Name Generator for Murofet", http://blog.threatexpert.com/2010/10/domain-name-generator-for-murofet.html, Oct. 14, 2010 (4 pages).

P Akritidis et al., "Efficient Content-Based Detection of Zero-Day Worms", 2005 IEEE International Conference in communications, vol. 2, pp. 837-843, May 2005.

M. Patrick Collins et al., "Hit-List Worm Detection and Bot Identification in Large Networks Using Protocol Graphs", RAID 2007, LNCS 4637, pp. 276-295 (2007).

Nicholas Weaver et al., "Very Fast Containment of Scanning Worms", In proceedings of the 13th USENIX Security Symposium, pp. 29-44, Aug. 9-13, 2004.

David Whyte et al., "DNS-Based Detection of Scanning Worms in an Enterprise Network", In Proc. of the 12th Annual Network and Distributed System Security Symposium, pp. 181-195, Feb. 3-4, 2005.

Cristian Abad et al., "Log Correlation for Intrusion Detection: A Proof of Concept", In Proceedings of the 19th Annual Computer Security Application Conference (ACSAC'03), (11 pages) (2003).

Lala A. Adamic et al., "Zipf's Law and the Internet", Glottometrics, vol. 3, pp. 143-150 (2002).

K.G. Anagnostakis et al., "Detecting Targeted Attacks Using Shadow Honeypots", In Proceedings of the 14th USENX Secuirty Symposium, pp. 129-144 (2005).

Paul Baecher et al., "The Nepenthes Platform: An Efficient Approach to Collect Malware", In Proceedings of Recent Advances in Intrusion Detection (RAID 2006), LNCS 4219, pp. 165-184, Sep. 2006.

Paul Barford et al., "An Inside Look at Botnets", Special Workshop on Malware Detection, Advances in Information Security, Spring Verlag, pp. 171-192 (2006).

James R. Binkley et al., "An Algorithm for Anomaly-Based Botnet Detection", 2nd Workshop on Steps to Reducing Unwanted Traffic on the Internet (SRUTI '06), pp. 43-48, Jul. 7, 2006.

Steven Cheung et al., "Modeling Multistep Cyber Attacks for Scenario Recognition", In Proceedings of the Third DARPA Information Survivability Conference and Exposition (DISCEX III), vol. 1, pp. 284-292, Apr. 22-24, 2003.

Evan Cooke et al., "The Zombie Roundup: Understanding, Detecting, and Disrupting Botnets", Steps to Reducing Unwanted Traffic on the Internet Workshop (SRUTI '05), pp. 39-44, Jul. 7, 2005.

Frederic Cuppens et al., "Alert Correlation in a Cooperative Intrusion Detection Framework", In Proceedings of IEEE Symposium on Security and Privacy 2002, pp. 202-215 (2002).

David Dagon et al., "Modeling Botnet Propagation using Time Zones", The 13th Annual Network and Distributed System Security Symposium 2006, Feb. 2-3, 2006 (18 pages).

Roger Dingledine et al., "Tor: The Second-Generation Onion Router", In Proceedings of the 13th Usenix Security Symposium, pp. 303-320 Aug. 9-13, 2004.

Steven T. Eckman et al., "STATL: An Attack Language for State-Based Intrusion Detection", Journal of Computer Security, vol. 10, pp. 71-103 (2002).

Daniel R. Ellis, et al., "A Behavioral Approach to Worm Detection", WORM'04, Oct. 29, 2004 (11 pages).

Prahlad Fogla et al., "Polymorphic Blending Attacks", In Proceedings of 15th Usenix Security Symposium, pp. 241-256, (2006).

Jan Goebel, "Rishi: Identify Bot Contaminated Hosts by IRC Nickname Evaluation", Hot Bots'07, Apr. 10, 2007 (14 pages).

Koral Ilgun et al., "State transition Analysis: A Rule-Based Intrusion Detection Approach", IEEE Transactions on Software Engineering, vol. 21, No. 3, pp. 181-199, Mar. 1995.

Xuxian Jiang et al., "Profiling Self-Propagating Worms Via Behavioral Footprinting", WORM'06, Nov. 3, 2006 (7 pages).

Giovanni Vigna et al., "NetSTAT: A Network-based Intrusion Detection Approach", In Proceedings of the 14th Annual Computer Security Applications Conference (ACSAC '98), pp. 25-34, Dec. 7-11, 1998.

Kelly Jackson Higgins, "Shadowserver to Build 'Sinkhole' Server to Find Errant Bots: new Initiative Will Emulate IRC, HTTP Botnet Traffic", http://darkreading.com/taxonomy/index/printarticle/id/211201241. Sep. 24, 2008 (2 pages).

Kelly Jackson Higgins, "Hacking a New DNS Attack: DNS Expert Disputes Georgia Tach and Google Research That Points to Malicious Deployment of Certain Types of DNS Servers", http://darkreading.com/taxonomy/index/printarticle/id/208803784. Dec. 18, 2007 (2 pages).

Christian Kreibich, "Honeycomb: Automated Signature Creation Using Honeypots", http://www.icir.org/christain/honeycomb/index.html, Mar. 26, 2007, (3 pages).

Artem Dinaburg et al., "Ether: Malware Analysis Via Hardware Virtualization Extensions", CCS'08, Oct. 27-31, 2008 (12 pages).

Paul Royal, "Alternative Medicine: The Malware Analyst's Blue Pill", Black Hat USA 2008, Aug. 6, 2008 (33 pages).

Paul Royal, "Alternative Medicine: The Malware Analyst's Blue Pill", www.damballa.com/downloads/r_pubs/KrakenWhitepaper.pdf (2008) (3pages).

Robert Perdisci et al., "Behavioral Clustering of HTTP-Based Malware and Signature Generation Using Malicious Network Traces", Usenix Symposium on Networked Systems Design and Implementation (NSDI 2010), (2010) (16 Pages).

Christopher Kruegel et al., "Polymorphic Worm Detection using Structural Information of Executables", RAID 2005, pp. 207-226 (2005).

Paul Vixie, "DNS Complexity", ACM Queue, pp. 24-29, Apr. 2007.

Ke Wang et al., "Anagram: a Content Anomaly Detector Resistant to Mimicry Attack", In Proceedings of the International Symposium on Recent Advances in Intrusion Detection (RAID) (2006) (20 pages).

Ke Wang et al., "Anomalous Payload-Based Worm Detection and Signature Generation", In Proceedings of the International Symposium on Recent Advances in Intrusion Detection (RAID) (2005) (20 pages).

David Whyte, "Exposure Maps: Removing Reliance on Attribution During Scan Detection", 1st Usenix Workshop on Hot Topics in Security, pp. 51-55 (2006).

Jiahai Yang et al., "CARDS: A Distributed System for Detecting Coordinated Attacks", In Sec (2000) (10 pages).

Vinod Yegneswaran et al., "Using Honeynets for Internet Situational Awareness", In proceedings of the Fourth Workshop on Hot Topics in Networks (HotNets IV), Nov. 2005 (6 pages).

David Dagon et al., "Corrupted DNS Resolution Paths: The Rise of a Malicious Resolution Authority", In Proceedings of Network and Distributed Security Symposium (NDSS '08) (2008) (15 pages).

Dihe's IP-Index Browser, http://ipindex.homelinux.net/index.php, updated Oct. 13, 2012 (1 page).

(56) References Cited

OTHER PUBLICATIONS

Shuang Hao et al., "An Internet-Wide View into DNS Lookup Patterns", http://labs.verisign.com/projects/malicious-domain-names/white-paper/dns-imc2010.pdf (2010) (6 pages).
Thorsten Holz et al., "Measuring and Detecting Fast-Flux Service Networks", In Proceedings of NDSS (2008) (12 pages).
Jaeyeon Jung et al., "DNS Performance and the Effectiveness of Caching", IEEE/ACM Transactions on Networking, vol. 10, No. 5, pp. 589-603, Oct. 2002.
The Honeynet Project & Research Alliance, "Know Your Enemy: Fast-Flux Service Networks: An Ever Changing Enemy", http://old.honeynet.org/papers/ff/fast-flux.html, Jul. 13, 2007 (10 pages).
Duane Wessels et al., "Measurements and Laboratory Simulations of the Upper DNS Hierarchy", In PAM (2005) (10 pages).
Joe Stewart, "Top Spam Botnets Exposed", http://www.secureworks.com/cyber-threat-intelligence/threats/topbotnets/, Apr. 8, 2008 (11 pages).
Brett Stone-Gross et al., "Your Botnet is My Botnet: Analysis of a Botnet Takeover", CCS'09, Nov. 9-13, 2009 (13 pages).
Sam Stover et al., "Analysis of the Storm and Nugache Trojans: P2P is here", Login, vol. 32, No. 6, pp. 18-27, Dec. 2007.
"Storm Botnet", http://en.wikipedia.org/wiki/Storm_botnet, Printed Jan. 29, 2013 (7 pages).
Jeff Williams, "What We Know (and Learn) for the Waledac Takedown", http://blogs.technet.com/b/mmpc/archive/2010/03/15/what-we-know-and-learned-from-the-waledac-takedown.aspx, Mar. 15, 2010 (2 pages).
"Trojan:Java/Boonan", http://microsoft.com/security/portal/threat/encyclopedia/entry.aspx?Name=Trojan%3AJava%2FBoonan, Apr. 17, 2011 (5 pages).
Julia Wolf, "Technical Details of Srizbi's Domain Generation Algorithm", http://blog.fireeye.com/research/2008/11/technical-details-of-srizbis-domain-generation-algorithm.html, Nov. 25, 2008 (4 pages).
Sandeep Yadav et al., "Detecting Algorithmically Generated Malicious Domain Names", In Proceedings of the 10th Annual Conference on Internet Measurement (IMC'10), pp. 48-61, Nov. 1-3, 2010.
"TEMU: The BitBlaze Dynamic Analysis Component", http://bitblaze.cs.berkeley.edu/temu.html, printed Jan. 29, 2013 (1 page).
Paul Bacher et al., "Know Your Enemy: Tracking Botnets: Using Honeynets to Learn More About Bots", http://www.honeynet.org/papers/bots, Aug. 10, 2008 (1 page).
Michael Bailey et al., "Automated Classification and Analysis of Internet Malware", RAID 2007, LNCS 4637, pp. 178-197 (2007).
Paul Barham et al., "Xen and the Art of Virtualization", SOSP'03, Oct. 19-22, 2003 (14 pages).
Ulrich Bayer et al., "TTAnalyze: A Tool for Analyzing Malware", In Proceedings of the 15th Annual Conference European Institute for Computer Antivirus Research (EICAR), pp. 180-192 (2006).
Fabrice Bellard, "QEMU, a Fast and Portable Dynamic Translator", In Proceedings of the Annual Confernce on Usenix Annual Technical Conference, pp. 41-46 (2005).
Kevin Borders et al., "Siren: Catching Evasive Malware (Short Paper)", IEEE Symposium on Security and Privacy, pp. 78-85, May 21-24, 2006.
Christopher M. Bishop, Pattern Recognition and Machine Learning (Information Science and Statistics), Springer-Verlag New York, Inc., Secauscus, NJ, USA, 2006.
Ronen Feldman et al., "The Text Mining Handbook: Advance Approaches in Analyzing Unstructured Data", Cambridge Univ. Pr., 2007.
Michael Hale Ligh et al., "Malware Analyst's Cookbook and DVD", Wiley, 2010.
M. Newman, "Networks: An Introduction", Oxford University Press, 2010.
Matt Bishop, "Computer Security: Art and Science", Addison-Wesley Professional, 2003.
Neils Provos et al., "Virtual Honeypots: Form Botnet Tracking to Intrusion Detection", Addison-Wesley Professional, Reading, 2007.
Michael Sipser, "Introduction to the Theory of Computation", International Thomson Publishing, 1996.
Peter Szor, "The Art of Computer Virus Research and Defense", Addison-Wesley Professional, 2005.
Anil K. Jain et al., "Algorithms for Clustering Data", Prentice-Hall, Inc., 1988.
V. Laurikari, "TRE", 2006 (5 pages).
P. Porras, "Inside Risks: Reflections on Conficker", Communications of the ACM, vol. 52, No. 10, pp. 23-24, Oct. 2009.
Changda Wang et al., "The Dilemma of Covert Channels Searching", ICISC 2005, LNCS 3935, pp. 169-174, 2006.
C. Willems et al., "Toward Automated Dynamic Malware Analysis Using CWSandbox", IEEE Security and Privacy, vol. 5, No. 2, pp. 32-39, 2007.
R Developmental Core Team, "R: A Language and Environment for statistical Computing", R. Foundation for Statistical Computing, Vienna Austria, 2008.
Simon Urbanek, "rJava: Low-Level-R to Java Interface", printed May 6, 2013 (5 pages).
Juan Caballero et al., "Polyglot: Automatic Extraction of Protocol Message Format Using Dynamic Binary Analysis", In Proceedings of ACM Conference on Computer and Communication Security, Oct. 2007 (15 pages).
Mihai Christodorescu et al., "Semantics-Aware Malware Detection", In Proceeding of the 2005 IEEE Symposium on Security and Privacy, pp. 32-46 (2005).
Mihai Christodorescu et al,. "Mining Specifications on Malicious Behavior", ESEC/FSE'07, Sep. 3-7, 2007 (10 pages).
Peter Ferrie, "Attacks on Virtual Machine Emulators", Symantec Advance Threat Research, 2006 (13 pages).
Peter Ferrie, "Attacks on More Virtual Machine Emulators", Symantec Advance Threat Research, http://pferrie.tripod.com/papers/attacks2.pdf, 2007 (17 pages).
Tal Garfinkel et al., "A Virtual Machine Introspection Based Architecture for Intrusion Detection", In Proceedings of Network and Distributed Systems Security Symposium, Feb. 2003 (16 pages).
G. Hunt et al., "Detours: Binary Interception of WIN32 Functions", Proceedings of the 3rd Usenix Windows NT Symposium, Jul. 12-13, 1999 (9 pages).
Xuxian Jiang et al., "Stealthy Malware Detection Through VMM-Based "Out-of-the-Box" Semantic View Reconstruction", CCS'07, Oct. 29-Nov. 2, 2007 (11 pages).
Xuxian Jiang et al., "Virtual Playgrounds for Worm Behavior Investigation", RAID 2005, LNCS 3858, pp. 1-21 (2006).
Min Gyung Kang et al., "Renovo: A Hidden Code Extract for Packed Executables", WORM'07, Nov. 2, 2007 (8 pages).
Christopher Kruegel et al., "Detecting Kernel-Level Rootkits Through Binary Analysis", In Proceedings of the Annual Computer Security Applications Conference (ACSAC), pp. 91-100, Dec. 2004.
Lorenzo Martignoni et al., "OmniUnpack: Fast, Generic, and Safe Unpacking of Malware", In Proceedings of the Annual Computer Security Applications Conference (ACSAC), pp. 431-441 (2007).
Thomas Raffetseder et al., "Detecting System Emulators", In ISC, pp. 1-18 (2007).
Paul Royal et al., "PolyUnpack: Automating the Hidden-Code Extraction of Unpack-Executing Malware", In Proceedings of the Annual Computer Security Applications Conference (ACSAC), pp. 289-300 (2006).
Rich Uhlig et al., "Intel Virtualization Technology", Computer, vol. 38, No. 5, pp. 48-56, May 2005.
Amit Vasudevan et al., "Stealth Breakpoints", In Proceedings of the 21st Annual Computer Security Applications Conference (ACSAC), pp. 381-392, (2005).
Amit Vasudevan et al., "Cobra: Fine-Grained Malware Analysis Using Stealth Localized-Executions", In Proceedings of the 2006 IEEE Symposium on Security and Privacy (S&P'06), pp. 264-279 (2006).
Yi-Min Wang et al., "Automated Web Patrol with Strider HoneyMonkeys: Finding Web Sites That Exploit Browser Vulnerabilities", In NDSS'06 (2006) (15 pages).

(56) References Cited

OTHER PUBLICATIONS

Heng Yin et al., "Panorama: Capturing System-Wide Information Flow for Malware Detection and Analysis", In Proceedings of ACM Conference on Computer and Communication Security, Oct. 29-Nov. 2, 2007 (13 pages).
Joanna Rutkowska, "Introducing Blue Pill", http://theinvisiblethings.blogspot.com/2006/06/introducing-blue-pill.html, Jun. 22, 2006 (26 pages).
Peter Ferrie, "Anti-Unpacker Tricks", In Proceedings of the 2nd International CARO Workshop (2008) (25 pages).
Danny Quist, "Covert Debugging Circumventing Software Armoring Techniques"; In Proceedings of Black Hat USA 2007 (2007) (5 pages).
Ulrich Bayer et al., "Scalable, Behavior-Based malware Clustering", In Network and Distributed System Security Symposium (2009) (18 pages).
David Brumley et al., "Automatically Identifying Trigger-Based Behavior in Malware", Botnet Detection, pp. 1-24 (2008).
Dancho Danchev, "Web Based Botnet Command and Control Kit 2.0", http://ddanchev.blogspot.com/2008/08/web-based-botnet-command-and-control.html, Aug. 22, 2008 (5 pages).
Ozgun Erdogan et al., "Hash-AV: Fast Virus Signature matching by Cache-Resident Filters", Int. J. Secur. Netw., vol. 2, pp. 50-59 (2007).
Fanglu Guo et al., "A Study of the Packer Problem and Its Solutions", In Recent Advances in Intrusion Detection (RAID 2008), LNCS 5230, pp. 95-115 (2008).
Maria Halkidi et al., "On Clustering Validation Techniques", Journal of Intelligent Information Systems, vol. 17, pp. 107-145 (2001).
A.K. Jain et al., "Data Clustering: A Review", ACM Computing Surveys, vol. 31, No. 3, pp. 264-323, Sep. 1999.
John P. John et al., "Studying Spamming Botnets using Botlab", In Usenix Symposium on Networked Systems Design and Implementation (NDSI), (2009) (16 pages).
Hyang-Ah Kim et al., "Autograph: Toward Automated, distributed Worm Signature Detection", In Usenix Security Symposium (2004) (16 pages).
Clemens Kolbitsch et al., "Effective and Efficient Malware Detection at the End Host", In 18th Usenix Security Symposium, pp. 351-366 (2009).
Kevin Borders et al., "Protecting Confidential Data on Personal Computers with Storage Capsules", In 18th Usenix Security Symposium, pp. 367-382 (2009).
Ralf Hund et al., "Return-Oriented Rootkits: Bypassing Kernel Code Integrity Protection Mechanisms", In 18th Usenix Security Symposium, pp. 383-398 (2009).
Christian Kreibich et al., "Honeycomb—Creating Intrusion Detection Signatures Using Honeypots", In ACM Workshop on Hot Topics in Networks (2003) (6 pages).
Zhichun Li et al., "Hamsa: Fast Signature Generational for Zero-Day Polymorphic Worms with Provable Attack Resilience", In IEEE Symposium on Security and Privacy (2006) (15 pages).
James Newsome et al., "Polygraph: Automatically Generating Signatures for Polymorphic Worms", In IEEE Symposium on Security and Privacy (2005) (16 pages).
Sun Wu et al., "AGREP—A Fast Approximate Pattern-Matching Tool", In Usenix Technical Conference (1992) (10 pages).
Vinod Yegneswaren et al.,, "An Architecture for Generating Semantics-Aware Signatures", In Usenix Security Symposium (2005) (16 pages).
Jaeyeon Jung, "Fast Portscan Detection Using Sequential Hypothesis Testing", In Proceedings of IEEE Symposium on Security Privacy, pp. 211-225 (2004).
Anestis Karasaridis et al., "Wide-Scale Botnet Detection and Characterization", In Usenix Workshop on Hot Topics in Understanding Botnets (HotBots'07), Apr. 11-13, 2007 (9 pages).
Carl Livades et al., "Using Machine Learning Techniques to Identify Botnet Traffic", In 2nd IEEE LCN Workshop on Network Security (WoNS'2006), pp. 967-974 (2006).

"CVE-2006-3439", http://cve.mitre.org/cgi-bin/cvename.cgi?name=CVE-2006-3439, printed Jun. 27, 2012 (2 pages).
David Moore, "Inferring Internet Denial-of-Service Activity", In Proceedings of the 10th Usenix Security Symposium, Aug. 13-17, 2001 (15 pages).
Peng Ning et al., "Constructing Attack Scenarios Through Correlation of Intrusion Alerts", In Proceedings of Computer and Communications Security (CCS'02), Nov. 18-22, 2002 (10 pages).
Vern Paxson, "Bro: A System for Detecting Network Intruders in Real-Time", In Proceedings of the 7th Usenix Security Symposium, Jan. 26-29, 1998 (22 pages).
Roberto Perdisci et al., "Using an Ensemble of One-Class SVM Classifiers to Harden Payload-Based Anomaly Detection Systems", In Proceedings of the 6th International Conference on Data Mining (ICDM'06), pp. 488-498, Dec. 2006.
Phillip A. Porras, "Privacy-Enabled Global Threat Monitoring", IEEE Security & Privacy, pp. 60-63 (2006).
Moheeb Abu Rajab et al., "A Multifaceted Approach to Understanding the Botnet Phenomenon", In Proceedings of the ACM SIGCOMM/Usenix Internet Measurement Conference (ICM'06), Oct. 25-27, 2006 (12 pages).
Anirudh Ramachandran et al., "Understanding the Network-Level Behavior of Spammers", In Proceedings of the 2006 Conference on Applications, Technologies, Architectures, and Protocols for Computer Communications (SIGCOMM'06), Sep. 11-16, 2006 (13 pages).
Martin Roesch, "SNORT—Lightweight Intrusion Detection for Networks", In Proceedings of 13th System Administration Conference (LISA'99), pp. 229-238, Nov. 7-12, 1999.
Robin Sommer et al., "Enhancing Byte-Level Network Intrusion Detection Signatures with Context", In Proceedings of the 10th ACM Conference on Computer and Communications Security (CCS'03), pp. 262-271, Oct. 27-30, 2003.
"W32/IRCBot-TO", http://www.sophos.com/virusinfo/analyses.w32ircbotto.html, Jan. 19, 2007 (1 page).
Stuart Staniford et al., "Practical Automated Detection of Stealthy Portscans", Journal of Computer Security, vol. 10, pp. 105-136 (2002).
S. Staniford-Chen et al., "GrIDS—A Graph Based Intrusion Detection System for Large Networks", In Proceedings of the 19th National Information Systems Security Conference, pp. 361-370 (1996).
Steven J. Templeton et al., "A Requires/Provides Model for Computer Attacks", In Proceedings of the 2000 Workshop on New Security Paradigms (NSPW'00), pp. 31-38 (2000).
Alfonso Valdes et al., "Probabilistic Alert Correlation", In Proceedings of the Recent Attack in Intrusion Detection (RAID 2001), LNCS 2212, pp. 54-68 (2001).
Fredrik Valeur et al., "A Comprehensive Approach to Intrusion Detection Alert Correlation", IEEE Transactions on Dependable and Secure Computing, vol. 1, No. 3, pp. 146-169, Jul. 2004.
Kjersti Aas et al., "Text Categorisation: A Survey", Norwegian Computing Center, Jun. 1999 (38 pages).
M. Andrews, "Negative Caching of DNS Queries (DNS NCACHE)", http://tools.ietf.org/html/rfc2308, Mar. 1998 (20 pages).
Simon Biles, "Detecting the Unknown with Snort and Statistical Packet Anomaly Detecting Engine", www.cs.luc.edu/~pld/courses/447/sum08/class6/biles.spade.pdf (2003) (9 pages).
James Newsome et al., "Paragraph: Thwarting Signature Learning by Training Maliciously", In Recent Advance in Intrusion Detection (RAID), 2005 (21 pages).
Jon Oberheide et al., "CloudAV: N-Version Antivirus in the Network Cloud", In Proceedings of the 17th Usenix Security Symposium, pp. 91-106 (2008).
Dan Pelleg et al., "X-Means: Extending K-Means with Efficient Estimation of the Number of Clusters", In International Conference on Machine Learning (2000) (8 pages).
Roberto Perdisci et al., "Misleading Worm Signature Generators Using Deliberate Noise Injection", In IEEE Symposium on Security and Privacy (2006) (15 pages).

(56) References Cited

OTHER PUBLICATIONS

Mark Felegyhazi et al., "On the Potential of Proactive Domain Blacklisting", In the Third Usenix LEET Workshop (2010) (8 pages).
Konrad Rieck et al., "Learning and Classification of Malware Behavior", DIMVA 2008, LNCS 5137, pp. 108-125 (2008).
Sumeet Singh et al., "Automated Worm Fingerprinting", In ACM/USENIX Symposium on Operating System Design and Implementation, Dec. 2004 (16 pages).
"EFnet Chat Network", http://www.efnet.org, dated Jun. 18, 2007 (3 pages).
Guofei Gu et al. "Bothunter: Detecting Malware Infection Through IDS-Driven Dialog Correlation", Proceedings of 16th USENIX Security Symposium, pp. 167-182 (2007).
The Conficker Working Group,"Conficker Working Group: Lessons Learned", Conficker_Working_Group_Lessons_Learned_17_June_2010_final.pdf, published Jan. 2011 (59 pages).
Manos Antonakakis et al., "The Command Structure of the Aurora Bonet", http://www.damballa.com/downloads/r_pubs/Aurora_Botnet_Command_Structure.pdf, 2010 (31 pages).
R. Arends et al. , "Protocol Modifications for the DNS Security Extensions", htp://www.ietf.org/rfc/rfc4035.txt, Mar. 2005 (50 pages).
R. Arends et al. , "DNS Security Introduction and Requirements", htp://www.ietf.org/rfc/rfc4033.txt, Mar. 2005 (20 pages).
R. Arends et al. , "Resource Records for the DNS Security Extensions", htp://www.ietf.org/rfc/rfc4034.txt, Mar. 2005 (28 pages).
Andreas Berger et al., "Assessing the Real-World Dynamics of DNS", Lecture Notes in Computer Science, vol. 7189, pp. 1-14 (2012).
Global Research & Analysis Team (GReAT), "Full Analysis of Flame's Command & Control Servers", http://www.securelist.com/en/blog/750/Full_Analysis_of_Flames_Command_Control_Servers, Sep. 17, 2012 (10 pages).
Nicolas Falliere et al., "W32.Stuxnet Dossier", http://www.symantec.com/content/en/us/enterprise/media/security_response/whitepapers/w32_stuxnet_dossier.pdf, Feb. 2011 (69 pages).
Steinar H. Gunderson, "Global IPv6 Statistics: Measuring the Current State of IPv6 for Ordinary Users", http://meetings.ripe.net/ripe-57/presentations/Colitti-Global_IPv6_statistics_-_Measuring_the_current_state_of_IPv6_for_ordinary_users_.7gzD.pdf, Oct. 24-30, 2008 (20 pages).
Jaeyeon Jung et al., "Modeling TTL-Based Internet Caches", IEEE INFOCOM 2003, pp. 417-426, Mar. 2003.
Srinivas Krishnan et al., "DNS Prefetching and Its Privacy Implications: When Good Things Go Bad", In Proceeding of the 3rd USENIX Conference on Large-Scale Exploits and Emergent Threats: Botnets, Spyware, Worms, and More (LEET'10), (2010) (9 pages).
Zhuoqing Morley Mao et al., "A Precise and Efficient Evaluation of the Proximity Between Web Clients and Their Local DNS Servers", In Proceedings of USENIX Annual Technical Conference (2002) (14 pages).
Mozilla Foundation, "Public Suffix List", http://publicsuffix.org/, printed May 23, 2013 (8 pages).
David Plonka et al., "Context-Aware Clustering of DNS Query Traffic", In Proceedings of the 8th IMC (2008) (13 pages).
RSA FraudAction Research Labs, "Anatomy of an Attack", http://blogs.rsa.com/rivner/anatomy-of-an-attack/, Apr. 1, 2011 (17 pages).
Steve Souders, "Sharing Dominant Domains", http://www.stevesouders.com/blog/2009/05/12/sharding-dominant-domains, May 12, 2009 (3 pages).
Paul Vixie, "What DNS Is Not", Communications of the ACM, vol. 52, No. 12, pp. 43-47, Dec. 2009.
N. Weaver et al., "Redirecting DNS for ADS and Profit", In USENIX Workshop on Free and Open communications on the Internet (FOCI), Aug. 2011 (6 pages).

Florian Weimer, "Passive DNS Replication", In Proceedings of the 17th Annual FIRST Conference on Computer Security Incident, Apr. 2005 (13 pages).
Manos Antonakakis et al., "Unveiling the Network Criminal Infrastructure of TDSS/TDL4", http://www.damballa.com/downloads/r_pubs/Damballa_tdss_tdl4_case_study_public.pdf, (undated) (16 pages), (Aug. 28, 2012).
Manos Antonakakis et al., "From Throw-Away Traffic to Bots: Detecting the Rise of DGA-Based Malware", In Proceedings of the 21st USENIX Conference on Security Symposium (Security'12), (2012) (16 pages).
T. Berners-Lee et al., "RFC3986—Uniform Resource Identifier (URI): Generic Syntax", http://www.hjp.at/doc/rfc/rfc3986.html, Jan. 2005 (62 pages).
Juan Caballero et al., "Measuring Pay-Per-Install: The Commoditization of malware Distribution", In Proceedings of the 20th USENIX Conference on Security (SEC'11), (2011) (16 pages).
Chih-Chung Chang et al., "LIBSVM: A Library for Support Vector Machines" ACM Transactions on Intelligent Systems and Technology 2011, Last Updated Jun. 14, 2007 (26 pages).
Dancho Danchev, "Leaked DIY Malware Generating Tool Spotted in the Wild", http://blog.webroot.com/2013/01/18/leaked-diy-malware-generating-tool-spotted-in-the-wild/, Jan. 18, 2013 (6 pages).
D. De La Higuera et al., "Topology of Strings: Median String is NP-Complete", Theoretical Computer Science, vol. 230, pp. 39-48 (2000).
Robert Edmonds, "ISC Passive DNS Architecture", http://kb.isc.org/getAttach/30/AA-00654/passive-dns-architecture.pdf, Mar. 2012 (18 pages).
Manuel Egele et al., "A Survey on Automated Dynamic Malware-Analysis Techniques and Tools", ACM Computing Surveys, vol. 44, No. 2, Article 6, pp. 6:1-6:42, Feb. 2012.
Dennis Fisher, "Zeus Source Code Leaked", http://threatpost.com/en_us/blogs/zeus-source-code-leaked-051011, May 10, 2011 (6 pages).
Guofei Gu et al., "BotSniffer: Detecting Botnet Command and Control Channels in Network Traffic", In Proceedings of the 15th Annual Network and Distributed System Security Symposium (NDSS'08), Feb. 2008 (18 pages).
Grefoire Jacob, "Jackstraws: Picking Command and Control Connections from Bot Traffic", In Proceedings of the 20th USENIX Conference on Security (SEC'11) (2011) (16 pages).
Jiyong Jang et al., "Bitshred: Feature Hashing Malware for Scalable Triage and Semantic Analysis", In Proceedings of the 18th ACM Conference on Computer and Communications Security (CCS'11), pp. 309-320, Oct. 17-21, 2011.
J. Zico Kolter et al., "Learning to Detect and Classify Malicious Executables in the Wild", Journal of Machine Learning Research, vol. 7, pp. 2721-2744, Dec. 2006.
John C. Platt, "Probablistic Outputs for Support Vector Machines and Comparisons to Regularized Likelihood Methods", Advances in Large margin Classifiers, vol. 10, No. 3, pp. 61-74, Mar. 26, 1999.
Team Cymru, "Developing Botnets", http://www.team-cymru.com/ReadingRoom/Whitepapers/2010/developing-botnets.pdf (2010) (3 pages).
Brett Stone-Gross et al., "Pushdo Downloader Variant Generating Fake HTTP Requests", http://www.secureworks.com/cyber-threat-intelligence/threats/Pushdo_Downloader_Variant_Generating_Fake_HTTP_Requests/, Aug. 31, 2012 (4 pages).
Peter Wurzinger et al., "Automatically Generating Models for Botnet Detection", In Proceedings of the 14th European Conference on Research in Computer Security (ESORICS'09), pp. 232-249 (2009).
Yinglian Xie et al., "Spamming Botnet: Signatures and Characteristics", In Proceeding of the ACM SIGCOMM 2008 Conference on Data Communications (SIGCOMM'08), pp. 171-182, Aug. 17-22, 2008.
Yajin Zhou et al., "Dissecting Android Malware: Characterization and Evolution", 2012 IEEE Symposium on Security and Privacy, pp. 95-109 (2012).

(56) References Cited

OTHER PUBLICATIONS

Nello Cristianini et al., "An Introduction to Support Vector Machines: and other Kernal-Based Learning Methods", Cambridge University Press, New York, NY, USA (2000).
Timo Sirainen, "IRSSI", http://en.wikipedia.org/wiki/Irssi, updated May 8, 2013 (3 pages).
Team Cymru, "IP to ASN Mapping", http://www.team-cymru.org/Services/ip-to-asn.html, printed Mar. 23, 2013 (6 pages).
http://www.bleedingsnort.com, retrieved from Internet Archive on May 23, 2013, Archived Sep. 26, 2006 (3 pages).
http://www.dshield.org, retrieved from Internet Archive on May 23, 2013, Archived Sep. 29, 2006 (2 pages).
http://www.alexa.com, retrieved from Internet Archive on May 23, 2013, Archived Sep. 25, 2006 (3 pages).
https://sie.isc.org/, retrieved from Internet Archive on May 23, 2013, Archived Dec. 29, 2008 (2 pages).
http://damballa.com, retrieved from Internet Archive on May 23, 2013, Archived Jan. 28, 2007 (10 pages).
http://www.dnswl.org, retrieved from Internet Archive on May 23, 2013, Archived Jul. 15, 2006 (4 pages).
http://www.spamhaus.org/sbl/, retrieved from Internet Archive on May 23, 2013, Archived Sep. 24, 2006 (24 pages).
http://malwaredomains.com, retrieved from Internet Archive on May 23, 2013, Archived Dec. 28, 2007 (12 pages).
http://www.opendns.com, retrieved from Internet Archive on May 23, 2013, Archived Sep. 9, 2006 (25 pages).
https://zeustracker.abuse.ch, retrieved from Internet Archive on May 23, 2013, Archived Oct. 26, 2010 (37 pages).
http://www.threatfire.com, retrieved from Internet Archive on May 23, 2013, Archived Aug. 22, 2007 (18 pages).
http://www.avira.com, retrieved from Internet Archive on May 23, 2013, Archived Sep. 29, 2006 (13 pages).
https://alliance.mwcollect.org, retrieved from Internet Archive on May 23, 2013, Archived Jan. 7, 2007 (2 pages).
http://malfease.oarci.net, retrieved from Internet Archive on Apr. 11, 2014, Archived Apr. 12, 2008 (2 pages).
http://www.oreans.com/themida.php, retrieved from Internet Archive on May 23, 2013, Archived Aug. 23, 2006 (12 pages).
http://www.vmware.com, retrieved from Internet Archive on May 23, 2013, Archived Sep. 26, 2006 (32 pages).
Thomas Ptacek, "Side-Channel Detection Attacks Against Unauthorized Hypervisors", http://www.matasano.com/log/930/side-channel-detection-attacks-against-unauthorized-hypervisors/, Aug. 20, 2007, retrieved from Internet Archive on May 23, 2013, Archived Aug. 27, 2007 (12 pages).
http://cyber-ta.org/releases/botHunter/index.html, retrieved from Internet Archive on May 23, 2013, Archived Aug. 30, 2007 (6 pages).
http://anubis.seclab.tuwien.ac.at, retrieved from Internet Archive on May 23, 2013, Archived Apr. 9, 2008 (2 pages).
http://www.siliconrealms.com, retrieved from Internet Archive on May 23, 2013, Archived Sep. 4, 2006 (12 pages).
http://bitblaze.cs.berkeley.edu, retrieved from Internet Archive on May 23, 2013, Archived Jan. 28, 2008 (4 pages).
http://www.dyninst.org, retrieved from Internet Archive on May 23, 2013, Archived Aug. 20, 2006 ( pages).
http://www.peid.info, retrieved from Internet Archive on May 23, 2013, Archived Dec. 4, 2007 (2 pages).
Mark Russinovich et al., "RegMon for Windows V7.04", http://technet.microsoft.com/en-us/sysinternals/bb896652.aspx, Published Nov. 1, 2006 (4 pages).
"Troj/Agobot-IB", http://www.sophos.com/virusinfo/analyses/trojagobotib.html, printed Jun. 27, 2012 (1 page).
Mark Russinovich et al., "FileMon for Windows V7.04", http://technet.microsoft.com/en-us/sysinternals/bb896642.aspx, Nov. 1, 2006 (6 pages).
"Norman Sandbox Whitepaper", Copyright Norman 2003 (19 pages).
Tanveer Alam et al., "Webinar: Intel Virtualization Technology of Embedded Applications", Intel, Copyright 2010 (34 pages).
F. Heinz et al., "IP Tunneling Through Nameserver", http://slashdot.org/story/00/09/10/2230242/ip-tunneling-through-nameservers, Sep. 10, 2000 (23 pages).
http://www.mcafee.com/us/, printed May 23, 2013 (23 pages).
"Windows Virtual PC", http://en.wikipedia.org/wiki/Windows_Virtual_PC, Last Modified May 5, 2013, Printed May 23, 2013 (21 pages).
Par Fabien Perigaud, "New Pill?", http://cert.lexsi.com/weblog/index.php/2008/03/21/223-new-pill, Mar. 21, 2008 (3 pages).
http://handlers.sans.org/jclausing/userdb.txt, printed May 24, 2013 (149 pages).
Avi Kivity et al., "KVM: The Linux Virtual Machine Monitor", Proceedings of the Linux Symposium, pp. 225-230, Jun. 27-30, 2007.
Symantec, "Symantec Global Internet Security Threat Report: Trends for 2008", vol. XIV, Apr. 2009 (110 pages).
File History of U.S. Appl. No. 11/538,212.
File History of U.S. Appl. No. 12/985,140.
File History of U.S. Appl. No. 13/008,257.
File History of U.S. Appl. No. 13/358,303.
File History of U.S. Appl. No. 14/304,015.
File History of U.S. Appl. No. 14/015,621.
File History of U.S. Appl. No. 14/015,661.
File History of U.S. Appl. No. 14/194,076.
Leo Breiman, "Bagging Predictors", Machine Learning, vol. 24, pp. 123-140 (1996).
David S. Anderson et al., "Spamscatter: Characterizing Internet Scam Hosting Infrastructure", Proceedings of the USENIX Security Symposium (2007) (14 pages).
Sujata Garera et al., "A Framework for Detection and Measurement of Phishing Attacks", WORM'07, pp. 1-8, Nov. 2, 2007.
Torsten Horthorn et al., "Double-Bagging: Combining Classifiers by Bootstrap Aggregation", Pattern Recognition, vol. 36, pp. 1303-1309 (2003).
Roberto Perdisci et al., "Detecting Malicious Flux Service Networks Through Passive Analysis of Recursive DNS Traces", Proceedings of ACSAC, Honolulu, Hawaii, USA (2009) (10 pages).
Shuang Hao et al., "Detecting Spammers with SNARE: Spatiotemporal Network-Level Automatic Reputation Engine", 18th USENIX Security Symposium, pp. 101-117 (2009).
Kazumichi Sato et al., "Extending Black Domain Name List by Using Co-Occurrence Relation Between DNS Queries", Presentation in the Third USENIX LEET Workshop (2010) (22 pages).
Sushant Sinha et al., "Shades of Grey: On the Effectiveness of Reputation-Based Blacklists", In 3rd International Conference on MALWARE (2008) (8 pages).
Zhiyun Qian et al., "On Network-Level Clusters for Spam Detection", In Proceedings of the USENIX NDSS Symposium (2010) (17 pages).
Bojan Zdrnja et al., "Passive Monitoring of DNS Anomalies", In Proceedings of DIMVA Conference (2007) (11 pages).
Jian Zhang et al., "Highly Predictive Blacklisting", In Proceedings of the USENIX Security Symposium (2008) (16 pages).
http://www.uribl.com/about.shtml, retrieved from Internet Archive on Mar. 16, 2016, Archived Jul. 22, 2010 (4 pages).
http://www.spamhaus.org/zen/, retrieved from Internet Archive on Mar. 16, 2016, Archived Jul. 6, 2010 (3 pages).
Mathew Sullivan, "Fighting Spam by Finding and Listing Exploitable Servers", Apricot 2006 (26 pages).
Mekky et al. (Detecting Malicious HTTP Redirections Using Trees of User Browser Activity, IEEE INFOCOM 2014, pp. 1159-1167).
File History of U.S. Appl. No. 12/538,612.
File History of U.S. Appl. No. 13/205,928.
File History of U.S. Appl. No. 13/309,202.
File History of U.S. Appl. No. 13/749,205.
File History of U.S. Appl. No. 14/015,582.
File History of U.S. Appl. No. 14/015,704.
File History of U.S. Appl. No. 14/041,796.
File History of U.S. Appl. No. 14/096,803.
File History of U.S. Appl. No. 14/305,998.
File History of U.S. Appl. No. 14/010,016.
File History of U.S. Appl. No. 14/015,663.
File History of U.S. Appl. No. 14/616,387.

(56) References Cited

OTHER PUBLICATIONS

File History of U.S. Appl. No. 14/668,329.
File History of U.S. Appl. No. 15/019,272.
Nan Jiang et al., "Identifying Suspicious Activities Through DNS Failure Graph Analysis", In proceedings of the 18th IEEE International Conference on Network Protocols (ICNP'10) IEEE Computer Society, Washington, DC, USA, 144-153 (2010).
Kristoff, "Botnets, Detection and Mitigation: DNS-Based Techniques," NU Security Day (2005) 23 pages, www.it.northwesterd.edu/bin/docs/bots_Kristoff_jul05.ppt.
Park et al. "Fast Malware Classification by Automated Behavioral Graph Matching" (2010) Proceedings of the Sixth Annual Workshop on Cyber Security and Information Intelligence Research (CSIIRW '10), ACM pp. 1-4.

\* cited by examiner

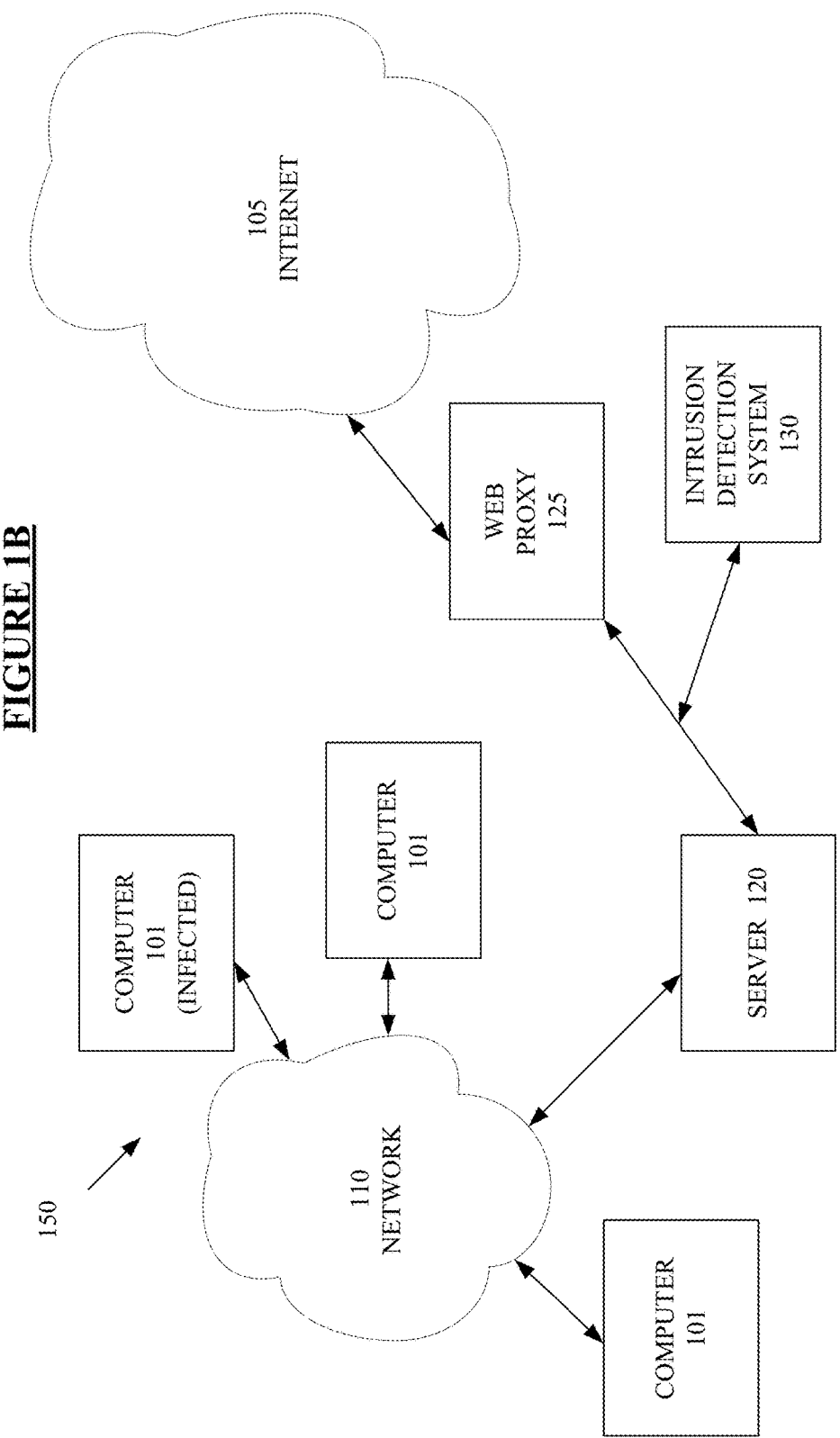

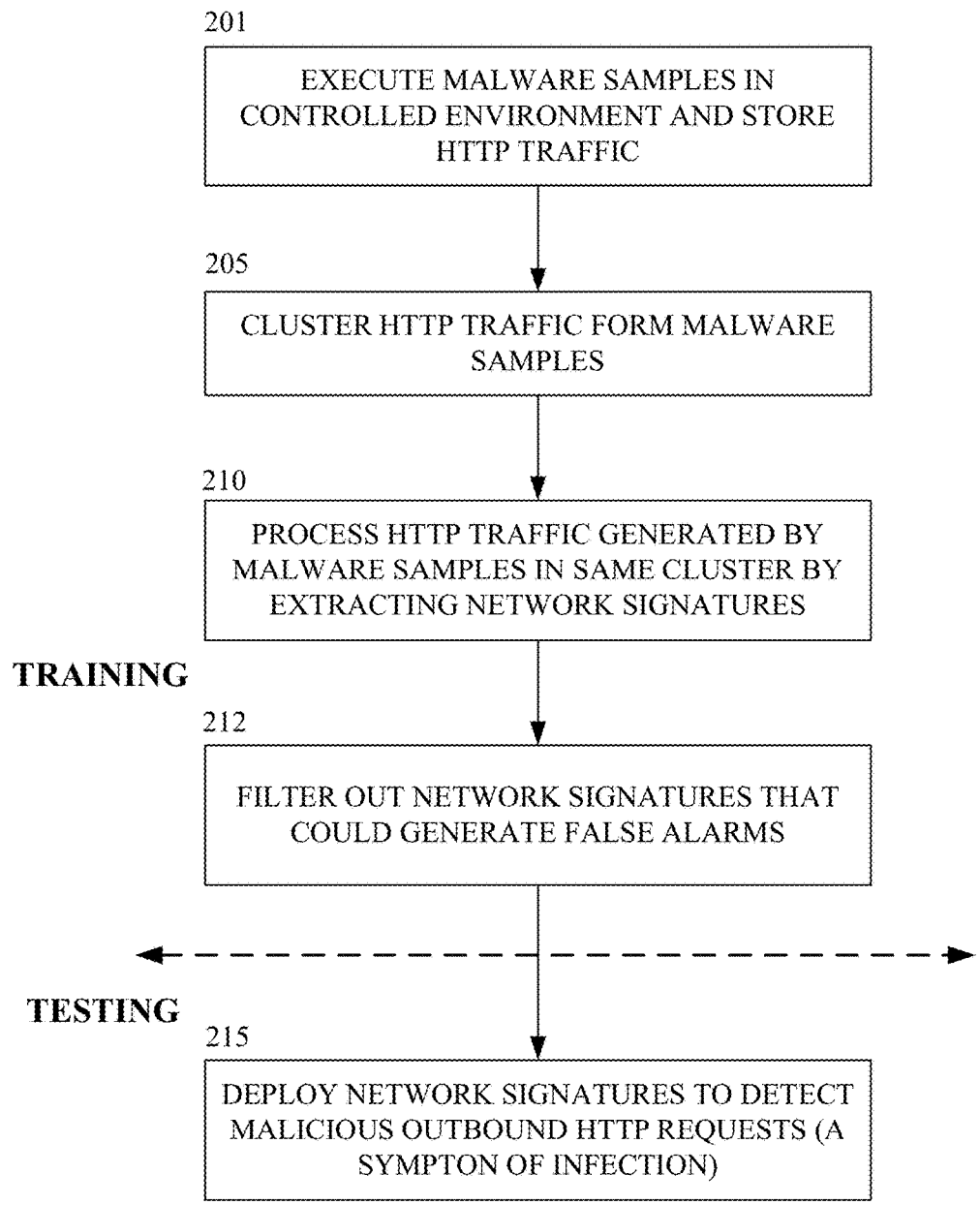

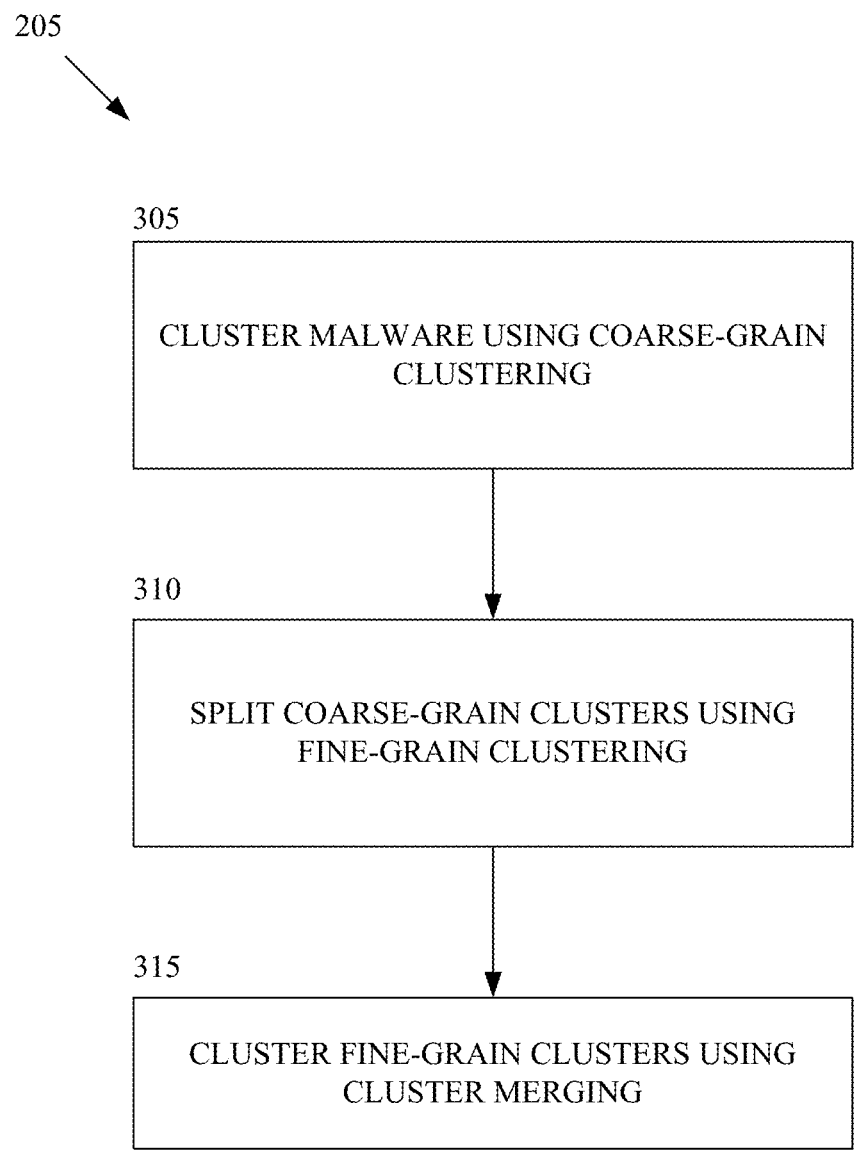

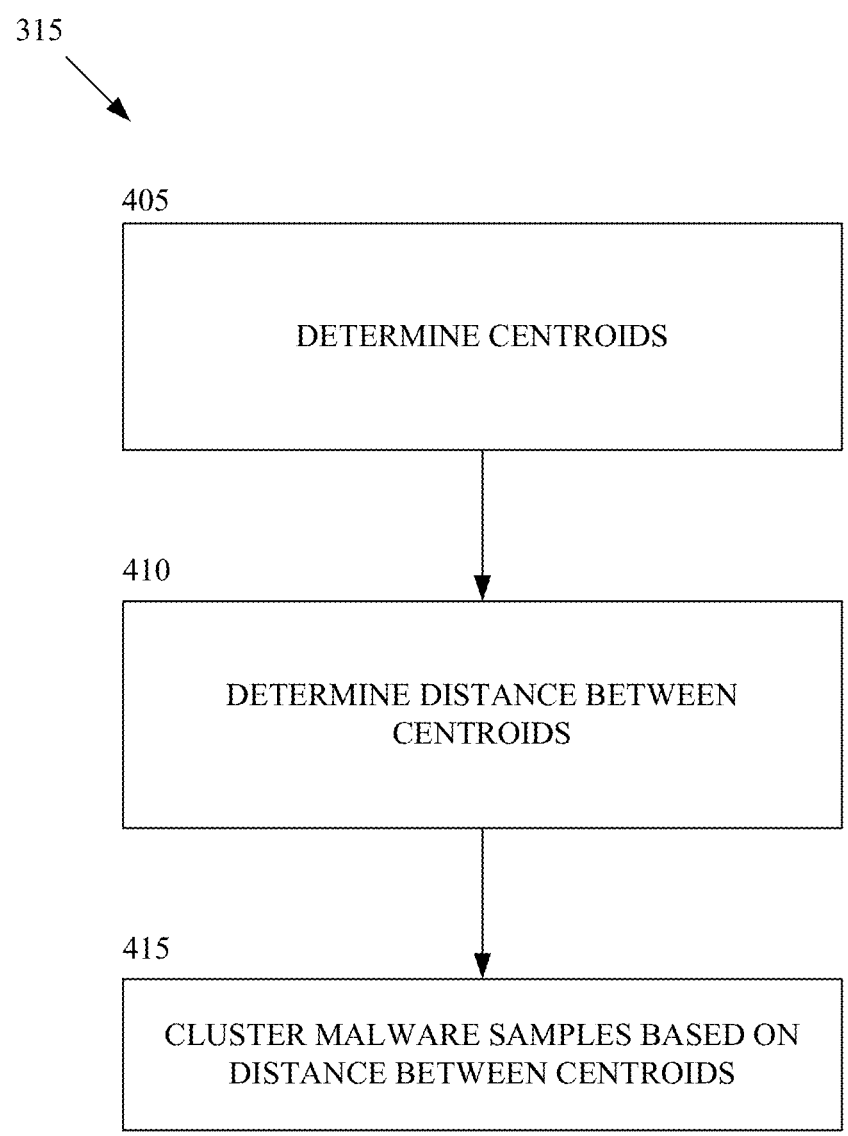

b) GET//command.php?id=1.&version=&cc=

METHOD AND SYSTEM FOR NETWORK-BASED DETECTING OF MALWARE FROM BEHAVIORAL CLUSTERING

CROSS-REFERENCE TO RELATED APPLICATIONS

This application is a continuation of U.S. patent application Ser. No. 13/008,257, filed Jan. 18, 2011, which claims priority of U.S. provisional patent application 61/296,288, filed Jan. 19, 2010, the entirety of which are incorporated by reference in their entireties.

BRIEF DESCRIPTION OF THE FIGURES

FIGS. 1B and 8 illustrate example systems for detecting infected computers using the behavioral clustering information, according to one embodiment.

FIGS. 2-4 illustrate a method for network-based behavioral clustering of malware, according to one embodiment.

SYSTEM FOR BEHAVIORAL CLUSTERING

Figure 1A:
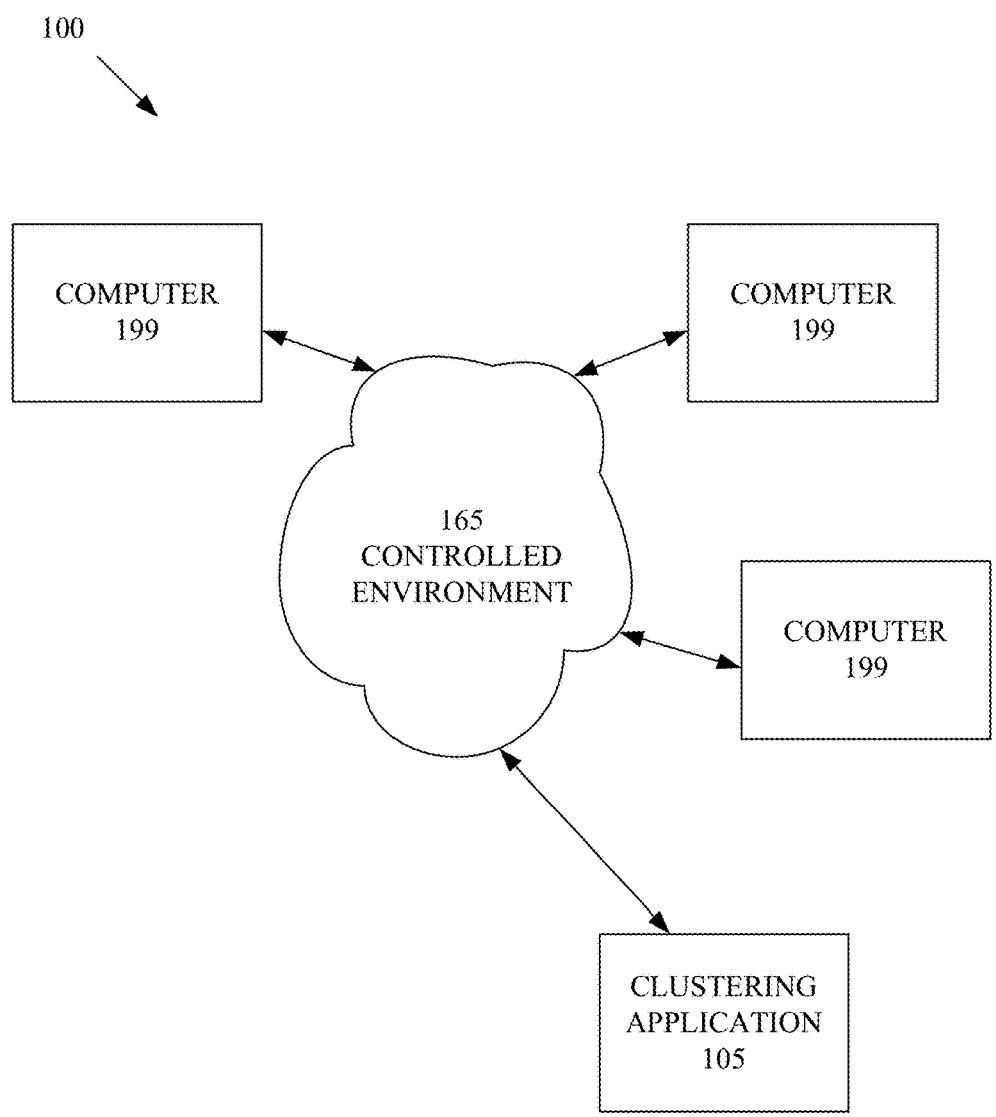
FIG. 1A illustrates a system for network-based behavioral clustering of malware, according to one embodiment.

FIG. 1A illustrates a system 100 for network-based behavioral clustering, according to one embodiment. FIG. 1A illustrates at least one clustering application 105 (described below) connected to at least one controlled environment 165 (e.g., University of Washington's BotLab™) of computers 199. The clustering application 105 can collect Hypertext Transfer Protocol (HTTP) traffic information from known malware samples. The HTTP traffic information from the malware samples can then be clustered by the clustering application 105. Multiple types of clustering can be used to help determine which clusters are similar, including, but not limited to: coarse-grain clustering, fine-grain clustering, and cluster merging, or any combination thereof. These types of clustering are described in more detail below. Once the HTTP traffic information is clustered, network signatures can be extracted for each cluster. These network signatures can be used to identify infected computers in other computer networks.

FIG. 1B illustrates a system 150 for detecting infected computers, using the behavioral clustering information, according to one embodiment. Computers 101 in a network 110 can send requests to the server 120, which are sent to a web proxy 125, which can review the requests (e.g., to see if the requests are to authorized web sites, to see if the web proxy 125 can provide an answer to the request from its archived material) before sending the requests to the Internet 105 seeking answers from other servers. An intrusion detection system (IDS) 130 can sit between the web proxy 125 and the server 120, and can utilize the network signature information from the clustering application 105 in order to detect whether or not certain malware has infected any of the computers 101. It should be noted that, in one embodiment, the intrusion detection system 130 can be run by the entity that controls the clustering application 105. In other embodiments, the intrusion detection system 130 can be controlled by at least one other entity.

Method for Network-Based Behavioral Clustering of Malware

FIG. 2 illustrates a method for behavioral clustering, according to one embodiment. In 201, malware samples of interest can be executed in a controlled environment 165 (e.g., BotLab™) for a certain amount of time and sequences of HTTP requests from the malware samples can be recorded and sent to the clustering application 105. In 205, the malware samples can be clustered by the clustering application 105. In 210, the HTTP requests generated by the malware samples in each cluster can be processed by extracting network signatures using the clustering application 105. In 212, network signatures that may generate false alarms can be filtered out. In 215, the network signatures for the cluster can be deployed by any intrusion detection system 130 to detect malicious outbound HTTP requests, which are a symptom of infection. It should be noted that 201, 205 and 210 concern obtaining network signature information for various malware (sometimes referred to as training); and 215 concerns using the network signature information to determine if computers 101 are infected (sometimes referred to as testing). Additional details related to FIG. 2 are set forth below.

Execute Malware Samples to Get HTTP Traffic.

As explained above, in 201, given a set of malware samples $M=\{m^{(i)}\}$ (where $i=1 \ldots N$), each malware sample $m^{(i)}$ can be executed in a controlled environment (e.g., BotLab™) for a time T. The HTTP traffic trace $H(m^{(i)})$ from each malware sample $m^{(i)}$ can then be stored.

For example, the following set of malware samples can be executed for a period of five minutes:

1854b17b1974cb29b4f83abc096cfe12.exe (sometimes referred to as TR/Crypt.NSPI.Gen)

3e570cda515c46b6a97f767ae6ae7056.exe (also sometimes referred to as TR/Crypt.NSPI.Gen)

Note that the file name can represent the MD5 hash of the executable file, which can be a cryptographic hash function often expressed as a 32-digit hexadecimal number. The HTTP traffic trace from this set of malware samples could include:

For the first malware sample:
[1248014141 192.168.16.15:1057=>222.189.238.210:80]
GET /tion/test.txt HTTP/1.1
User-Agent: ErrCode
Host: www.qq.com.aaadmin5.com
Cache-Control: no-cache
HTTP/1.1 200 OK
Content-Length: 89
Content-Type: text/plain
Last-Modified: Sat, 6 Jun. 2009 07:58:24 GMT
Accept-Ranges: bytes
ETag: "a2953917ce6c91:c4a"
Server: Microsoft-IIS/6.0
Date: Tue, 23 Jun. 2009 15:47:05 GMT
[ . . . DATA . . . ]

Note that the above trace (as well as the trace below) includes an HTTP request and the related HTTP response. For example, in the example above, the request starts with "GET . . . " and ends with "Cache-Control: no-cache". The response starts with "HTTP/1.1 200 OK" and ends with "[ . . . DATA . . . ]".

For the second malware sample:
[1248014141 192.168.16.15:1059=>222.189.238.210:80]
GET /sd/02ceo.jpg HTTP/1.1
Accept: */*
Accept-Encoding: gzip, deflate User-Agent: Mozilla/4.0 (compatible; MSIE 6.0; Windows NT 5.1)
Host: record.orangebeartv.com
Connection: Keep-Alive
HTTP/1.1 200 OK
Content-Length: 99449
Content-Type: image/jpeg
Last-Modified: Sun, 17 May 2009 05:15:15 GMT
Accept-Ranges: bytes
ETag: "62e06e76aed6c91:c4a"
Server: Microsoft-IIS/6.0
Date: Tue, 23 Jun. 2009 15:47:06 GMT
[ . . . DATA . . . ]

Partition Malware Samples into Clusters.

As explained above, in 205, the set of malware samples M can be partitioned into clusters using structural similarities among the HTTP traffic traces $H(m^{(i)})$. In order to better attain high quality clusters and decrease costs of clustering, in some embodiments, as illustrated in FIG. 3, clustering can be done using coarse-grain clustering, fine-grain clustering, or cluster merging, or any combination thereof. Coarse-grain clustering, fine-grain clustering and cluster merging can all utilize single-linkage hierarchical clustering (which sets up a tree (i.e., dendrogram) defining relationships among malware samples) and/or a DB index validation (which decides at what height the tree (i.e., dendrogram) should be cut to form clusters in a manner that causes the clusters to be compact and well-separated). Details related to single-linkage hierarchical clustering, DB index validation, coarse-grain clustering, fine-grain clustering, and cluster merging are discussed below.

Single-linkage hierarchical clustering. Single-linkage hierarchical clustering can set up a dendrogram, which can be a tree-like data structure where leaves represent malware samples, and the length of the edges (i.e., the lines) represent the distance between clusters to help define relationships among malware samples. In order to apply single-linkage hierarchical clustering on the malware samples, distance (e.g., distance in Euclidean space, distance not in Euclidean space) can be defined between each pair of malware samples. A distance matrix $D=\{d_{ij}\}$ (where i,j=1 . . . n), can comprise a distance $d_{ij}$ between each pair of objects (e.g., malware samples). For example, assuming we have three objects $\{o_1, o_2, o_3\}$, an example of distance matrix D may be: 0 4 1 4 0 2 1 2 0.

In this matrix, $o_1$, $o_2$, $o_3$ can be horizontal vectors or vertical vectors (note that they are symmetrical). Distance can be defined in any manner that usefully describes the difference between the malware. For example, if the three objects $o_1$, $o_2$, $o_3$ are vectors with values representing features of three different malware samples, the distance between the malware samples can be defined as the difference between the different features (e.g., statistical features, structural features) of the malware samples. (For an example of how different features of data can be compared using a defined distance, see, e.g., U.S. Provisional Application 61/292,592, entitled, "Method and System for Detecting Malware", which is herein incorporated by reference.) For example, the distance between the malware samples could be defined as the Euclidean distance between the vectors with values representing features of the different malware samples such that the distance between $o_1$ and $o_2$ is equal to 4, the distance between $o_1$ and $o_3$ is 1, and the distance between $o_2$ and $o_3$ is 2. Notice that D must be symmetric by definition, and the diagonal elements are equal to zero because the distance of an object to itself is always zero.

The single-linkage hierarchical clustering algorithm can take D as an input and can produce a dendrogram. An example dendrogram is shown in FIG. 9.

Figure 9:
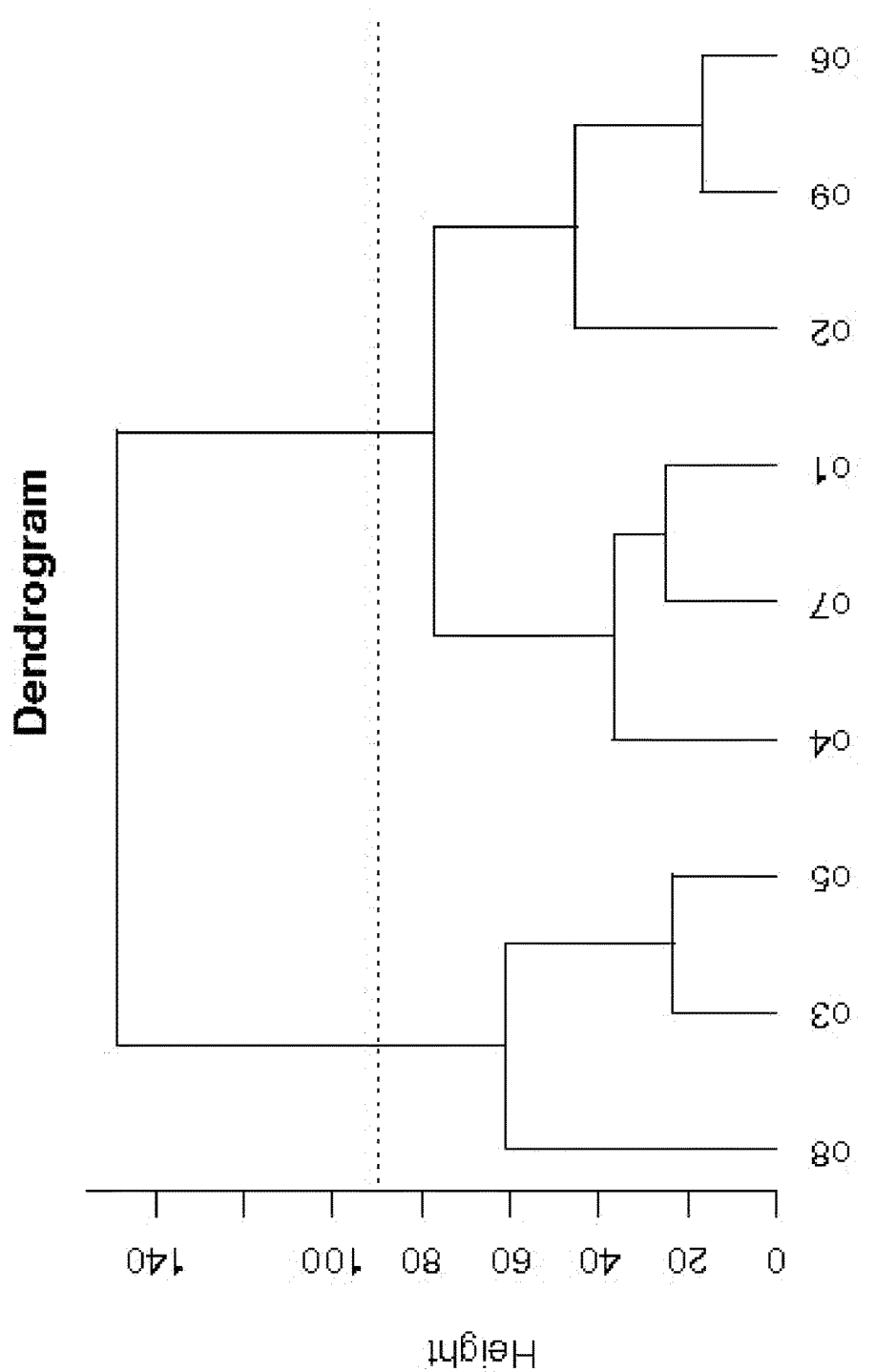
FIG. 9 is a sample dendrogram.

Note that, in the example FIG. 9 dendrogram, the objects are listed along the horizontal line, and the height is listed along the vertical line. (Any scale can be used for the height, as it is the comparisons of height that are useful.) If the objects (e.g., malware samples) are $O=\{o_1, o_2, \ldots o_n\}$, the distance between two clusters $C_i=\{o(o^{(i)}_k)\}$ (where k=1 . . . $c_i$) and $C_j=\{o^{(j)}_k)\}$ (where j=1 . . . $c_j$) can be $\delta_{i,j}=\min_{l,m}\{d_{ij}=(o^{(i)}_l, o^{(j)}_m)\}$. The subscripts l and m are indexes, with l=1, . . . , $c_i$, and m=1, . . . , $c_j$. The function $d_{ij}$ computes the distance between objects in cluster $C_i$ and in cluster $C_j$.

For example, the set O can be a set of vectors of real numbers (e.g., representing statistical features of the malware). That is, the i-th member of O can be $o_i=[x_{i1}, x_{i2}, \ldots, x_{in}]$. A concrete example may be $o_i=[2.1, 1E-9, -3, 100]$. The distance between two objects may be the well-known Euclidean distance. A cluster $C_s$ can be a subset of O that can include a certain number of objects belonging to O that are close to each other (and therefore form a group).

The obtained example FIG. 9 dendrogram can thus define relationships among objects (e.g., malware samples). A partitioning of the set of objects O (e.g., malware samples) into clusters can be obtained by cutting the dendrogram at a certain height h, using a DB index described below. (It should be noted that in other embodiments, other indexes can be used to determine height h.)

DB Index.

Clustering can involve utilizing a DB index to find the value of the height h of the dendrogram cut that produces the most compact and well-separated clusters. Thus, the DB index could indicate that the dendrogram needs to be cut at the grandparent or great-grandparent level in order to produce the most compact and well-separated clusters. The DB index can be based on a measure of intra-cluster dispersion (e.g., the average distance between all the possible pairs of objects within a cluster), and inter-cluster separation (e.g., the distance between the centers of the clusters). The DB index can be defined as: $\Delta i,j=\delta i+\delta j \delta i, j DB(h)=1c(h)\Sigma i=1c(h)$ max $j=1.,c(h),j\approx i\{\Delta i,j\}$ where $\delta i$ and $\delta j$ can represent a measure of dispersion for cluster $C_i$ and $C_j$, respectively. In addition, $\delta_{i,j}$ can be the separation (or distance) between the two clusters, c(h) can be the total numbers of clusters produced by a dendrogram cut at height h, and DB(h) can be the related DB index. The lower the height h, the more compact and well separated the clusters can be. Therefore, the best clustering can be found by cutting the dendrogram at height $h^*=\arg\min_{h>0} DB(h)$.

For example, according to the FIG. 9 dendrogram, we can compute the value of the DB index for all the values of height h in the range 0 to 140. If the value of DB(90) is the minimum among all the computed values DB(0), DB(1), . . . , DB(140), h=90 can be chosen as the "cut height".

The leaves that form a connected sub-graph after the cut can be considered part of the same cluster. For example, using the example FIG. 9 dendrogram, if we cut the dendrogram at height h=90 the following two clusters can be obtained: $C_1=\{o_8, o_3, o_5\}$, $C_2=\{o_4, o_7, o_1, o_2, o_9, o_6\}$. As done in the case of $C_1$ and $C_2$, each cluster can be chosen based on the highest connection between the values of the DB index of height h.

Different values of the height h of the cut can produce different clustering results. For example, if the example FIG.

9 dendrogram had a cut at height h=70, instead of h=90, the following three clusters could be chosen:

$C_1=\{o_8, o_3, o_5\}$, $C_2=\{o_4, o_7, o_1\}$, and $C_3=\{o_2, o_9, o_6\}$.

Coarse-Grain Clustering.

FIG. 3 sets forth additional details related to coarse-grain clustering, fine-grain clustering, and cluster merging. In 305, coarse-grain clustering can cluster malware samples based on statistical features extracted from their malicious HTTP traffic. For example, if $M=\{m^{(i)}\}$ (where i=1 . . . N) is the set of malware samples, and $H(m^{(i)})$ is the HTTP traffic trace obtained by executing malware m(i) for a given time T, each trace $H(m^{(i)})$ can be translated into a pattern vector $v^{(i)}$, which can contain statistical features X: total number of HTTP requests, number of GET requests, number of POST requests, average length of URLs, average number of parameters in the request; average amount of data sent by POST requests, or average length of the response, or any combination thereof. It should be noted that other statistical features can also be included.

For example, if we take into consideration the first malware and therefore the first HTTP traffic trace, the statistical features would be:

Number of HTTP requests=1
Number of GET requests=1
Number of POST requests=0
Average length of the URLs=18
Average number of parameters in the request=0
Average amount of POST data sent=0
Average length of the response=89.

Because the range of statistical features can be wide, the dataset can be standardized so that the statistical features can have a mean equal to zero and a variance equal to 1. For example, each feature X can be replaced with X'=(X-m)/s, where m and s can represent the average and standard deviation of feature X, respectively. For example, assume we have the following values of feature X in an hypothetical dataset D: $x_1=2$, $y_1=5$, $z_1=-3.2$. In this case the average is m=1.27 and the standard deviation is 4.15. After normalization, the new dataset D' contains: $x_1'=0.18$, $y_1'=0.90$, $z_1'=-1.08$.

Once the statistical features are standardized, the Euclidian distance can be applied. The Euclidean distance is a well-known, formally defined distance between vectors of numbers. It is defined as $d(x,y)=\text{sqrt}(\text{sum}_i(x_i-y_i)^2)$, where sqrt is the root square function, $\text{sum}_i$ is the summation across index i, $x_i$ is the i-the element of pattern vector x, and $y_i$ is the i-th element of pattern vector y.

Thus, for example, if the Euclidean distance is applied to the standardized dataset D', the resulting distance matrix is:

$$\begin{matrix} 0 & 0.72 & 1.25 \\ 0.72 & 0 & 1.98 \\ 1.25 & 1.98 & 0 \end{matrix}$$

because $d(x_1', x_1')=0$, $d(x_1', y_1')=0.72$, $d(x_1', z_1')=1.25$, $d(y_1', x_1')=0.72$, $d(y_1', y_1')=0$, $d(y_1', z_1')=1.98$, $d(z_1', x_1')=1.25$, $d(z_1', y_1')=1.98$, $d(z_1', z_1')=0$, where the function d( ) is the Euclidean distance defined above.

Once the course grain distance is found using the Euclidean distance definition, the set of malware samples M can then be partitioned into coarse-grain clusters by applying the single-linkage hierarchal clustering algorithm and cluster validity analysis based on the DB index as described above. As with the example FIG. 9 dendrogram and dendrogram cut, the DB index can be applied to each height h, and the dendrogram can be cut at the lowest value for DB(h) to find the best coarse-grain clustering.

It should be noted that course-grain clustering, fine-grain clustering, and cluster merging all use the DB index with the dendrogram and dendrogram cut. Only the formal description of the objects to be clustered and the function used to measure the definition of distance between pairs of objects needs to be changed.

Fine-Grain Clustering.

Figure 5:
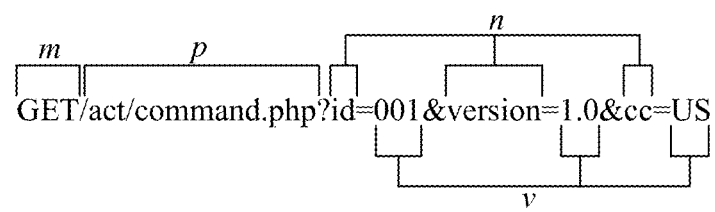
FIGS. 5-7 illustrate examples of network-based behavioral clustering of malware, according to several embodiments.

Referring again to FIG. 3, in 310, fine-grain clustering can be used to split the large coarse-grain clusters into smaller clusters. In fine-grain clustering, structural features are taken into account. The distance between two HTTP requests, $r_k^{(i)}$ and $r_h^{(j)}$, generated by two different malware samples $m^{(i)}$ and $m^{(j)}$, is defined as:

$$d_r(r_k^{(i)}, r_h^{(j)}) = w_m \cdot d_m(r_k^{(i)}, r_h^{(j)}) + w_p \cdot d_p(r_k^{(i)}, r_h^{(j)}) + w_n \cdot d_n(r_k^{(i)}, r_h^{(j)}) + w_v \cdot d_v(r_k^{(i)}, r_h^{(j)})$$

Where m, p, n, and v represent different parts of an HTTP request, as depicted in FIG. 5.

Specifically, m can represent a request method (e.g., GET, POST, HEADER), and the distance $d_m(r_k^{(i)}, r_h^{(j)})$ between these components of the requests is equal to 0 if the requests $r_k^{(i)}$ and $r_h^{(j)}$ both use the same method (e.g., both are GET requests). Otherwise, if the requests do not use the same method, the distance $d_m(r_k^{(i)}, r_h^{(j)})$ is equal to 1. For example, the example malware 1 and malware 2 traffic set forth above indicates that both are GET requests. Thus, the distance $d_m$ between them is equal to 0.

The subscript p can represent the first part of the URL that includes the path and page name (e.g., p=act/command.php in FIG. 5, /tion/text.txt in malware example 1, and /sd/02ceo.jpg in malware example 2). The distance $d_p(r_k^{(i)}, r_h^{(j)})$ can be equal to the normalized Levenshtein distance between the strings related to the path and pages that appear in the two requests $r_k^{(i)}$ and $r_h^{(j)}$. (The normalized Levenshtein distance between two strings $s_1$ and $s_2$ is equal to the minimum number of character operations (e.g., insert, delete, or replace) needed to transform one string into the other, divided by max (length $(s_1)$, length $(s_2)$).) For example, if it is assumed string $s_1$="Hello my friend", and $s_2$="Hello friends", the Levenshtein distance is equal to 4, because in order to transform $s_1$ into $s_2$ we need to: delete the substring "my_" (equal to 3 character deletions); and add the character "s" (equal to 1 addition) at the end of the new string. The NORMALIZED Levenshtein distance can thus be equal to 4/15 (4=Levenshtein distance; max of $s_1$, $s_2$=15 because there are 15 characters in the longer string)=0.267.

The subscript n can represent a set of parameter names (e.g., n=id, version, cc in FIG. 5), and $d_n(r_k^{(i)}, r_h^{(j)})$ can be equal to the Jaccard distance between the sets of parameter names in the two requests. (The Jaccard distance between two sets A and B is defined as $$J(A, B) = 1 - \frac{|A \cap B|}{|A \cup B|}.)$$

For example, if it is assumed that A={apple, tree, banana, orange}, and B={pineapple, orange, tree, fruit, juice}. The elements in common to sets A and B are tree and orange=2 elements The union of A and B can thus be equal to {apple, tree, banana, orange, pineapple, fruit, juice}=7 elements. Therefore, the Jaccard distance between A and B can be J(A,B)=1−2/7=1−0.286=0.714.

The subscript v can be the set of parameter values, and distance $d_v(r_k^{(i)}, r_h^{(j)})$ can be equal to the normalized Levenschtein distance between strings obtained by concatenating the parameter values (e.g., 0011.0US in FIG. 5). For example, if it is assumed that request $r_1$=GET /act/command.php?id=001&version=1.0&cc=US, and request $r_2$=GET /act/command.php?id=002&version=1.0&cc=US. In this case the distance $d_v(r_1, r_2)$ is equal to the normalized Levenschtein distance between strings "0011.0US" and "0021.0US". Namely $d_v(r_1,r_2)$=⅛=0.125.

Figure 6:
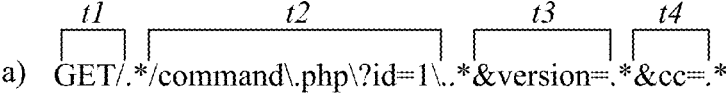

The factors $w_x$, where $x \in \{m, p, n, v\}$, can be predefined weights (the actual value that can be assigned to weights $w_x$ are discussed below with respect to FIG. 6) that can give more importance to the distance between the requests' method and page, for example, and less weight to the distance between parameter values. For example, the following values can be set: $w_m$=10, $w_p$=5, $w_n$=3, $w_v$=1.

Using the above information, the fine-grain distance between two malware samples can then be defined as the average minimum distance between sequences of HTTP requests from the two samples. Thus:

$$d_{i,j}^{(fg)} = \frac{1}{2} avg_k \left\{ \min_h \{d_r(r_k^{(i)}, r_h^{(j)})\} \right\} + \frac{1}{2} avg_h \left\{ \min_k \{d_r(r_k^{(i)}, r_h^{(j)})\} \right\}$$

Once the fine-grain distance is found between malware samples, the single-linkage hierarchical clustering algorithm and the DB cluster validity index can then be applied to split each coarse-grain cluster into fine-grain clusters. Thus, as with the example FIG. 9 dendrogram and dendrogram cut, the DB index can be applied to each height h, and the dendrogram can be cut at the lowest value for DB(h) to find the best fine-grain clustering.

It should be noted that, while GET requests have the parameter names and the parameter values "inline" in the URL (e.g., see FIG. 5), this may not be true for other requests (e.g., POST requests) due to different network protocols. However, it should be noted that, for other types of requests (e.g., POST requests), it may often be very easy to retrieve the parameter names and the parameter values from the data section at the end of the HTTP query due to network protocols. Thus, it follows that the distance $d_{i,j}^{(fg)}$ described above can be used for many kinds of requests (e.g., GET requests, POST requests, other HTTP requests).

It also should be noted that, in some embodiments, the fine-grain distance between malware samples does not need to take into account the domain name or IP address related to the Web server to which the HTTP requests are sent, because this information may change frequently from one malware variant to another (e.g., the attacker can rapidly move from one control server to another, and the already-infected machines can be updated by sending them an update server command.) However, in some embodiments, the domain name and/or IP address related to the Web server can be used.

Cluster Merging.

While fine-grain clustering (which is performed after coarse-grain structuring) is based on structural features, coarse-grain clustering is based on statistical features, and thus malware belonging to the same family (according to their HTTP behavior in terms of the HTTP traffic they generate) can end up in different coarse-grain, and in turn, fine-grain clusters. Thus, in 315 (FIG. 3), a further clustering step can be used where clusters of malware that have similar HTTP behavior, but which have been split during coarse-grain clustering, can be merged together in a process called cluster merging (also called meta-clustering).

FIG. 4 illustrates details related to cluster merging, according to one embodiment. In 405, given a set of fine-grain malware clusters, a cluster centroid for each of the clusters can be defined. A cluster centroid can summarize HTTP requests performed by malware samples in a particular cluster. In 410, distances between centroids (and therefore between clusters) can be defined. In 415, meta-clustering can then group together malware samples that are very close to each other based on the determined distances, even if they are in different course-grain clusters. In some embodiments, these malware sample clusters can be merged to form bigger clusters, again, even across course-grain clusters. Details related to these elements of FIG. 4 are set forth below.

As set forth in 405, cluster centroids are first defined. If $C_i=\{m_k^{(i)}\}$ (where k=1 . . . $c_i$) is a cluster of malware samples, $H_i=\{H(m_k^{(i)})\}$ (where k=1 . . . $c_i$) can be the related set of HTTP traffic traces obtained by executing each malware sample in $C_i$. For example, the traffic trace from the first malware example given above may be used as one of the traffic traces in $H_i$. As explained earlier, this traffic trace can be obtained by executing one of the malware samples in Ci.

Thus, for example, if the first malware sample in cluster $C_1$ is:
$m_1^{(1)}$=1854b17b1974cb29b4f83abc096cfe12.exe
Then the traffic trace H ($m_1^{(1)}$) can be:
[1248014141 192.168.16.15:1057=>222.189.238.210:80]
GET /tion/test.txt HTTP/1.1
User-Agent: ErrCode
Host: www.qq.com.aaadmin5.com
Cache-Control: no-cache
HTTP/1.1 200 OK
Content-Length: 89
Content-Type: text/plain
Last-Modified: Sat, 6 Jun. 2009 07:58:24 GMT
Accept-Ranges: bytes
ETag: "a2953917ce6c91:c4a"
Server: Microsoft-IIS/6.0
Date: Tue, 23 Jun. 2009 15:47:05 GMT
[ . . . DATA . . . ]
Similarly, if the second malware sample in cluster $C_1$ is:
$m_1^{(2)}$=3e570cda515c46b6a97f767ae6ae7056.exe
Then the traffic trace H ($m_1^{(2)}$) can be:
[1248014141 192.168.16.15:1059=>222.189.238.210:80]
GET /sd/02ceo.jpg HTTP/1.1
Accept: */*
Accept-Encoding: gzip, deflate
User-Agent: Mozilla/4.0 (compatible; MSIE 6.0; Windows NT 5.1)
Host: record.orangebeartv.com
Connection: Keep-Alive
HTTP/1.1 200 OK
Content-Length: 99449
Content-Type: image/jpeg
Last-Modified: Sun, 17 May 2009 05:15:15 GMT
Accept-Ranges: bytes
ETag: "62e06e76aed6c91:c4a"
Server: Microsoft-IIS/6.0
Date: Tue, 23 Jun. 2009 15:47:06 GMT
[ . . . DATA . . . ]
The centroid of $C_i$ can be represented as a set of network signatures $S_i=\{s_j\}$ (where j=1, . . . $l_i$) from a set of HTTP request pools $Pi=\{p_j\}$ (where j=1, . . . $l_i$).

For example, a centroid could comprise the following two signatures:
GET /tion.*1/test\.txt
GET /sd/0.*ceo\.jpgid.*

Each signature $s_j$ can be extracted from a pool $p_j$ of HTTP requests selected from the traffic traces in $H_i$.

In order to create a set of request pools $P_i$, one of the malware samples in cluster $C_i$ can be randomly selected as the centroid seed. For example, assume $m_h^{(i)}$ is the first malware sample given above (1854b17b1974cb29b4f83abc096cfe12.exe) and assume this is picked as the centroid seed. Then, the set of HTTP requests in the HTTP traffic trace can be $H(m_h^{(i)})=\{r_j\}$ (where $j=1, \ldots l_i$), where $r_j$ represents the j-th HTTP request in the traffic trace $H(m_h^{(i)})$. The pool set $P_i$ can be initialized by putting each request $r_j$ in a different (and until initialized, empty) pool $p_j$ (where $j=1, \ldots l_i$). Using the definition of distance $d_p$ $(r_k^{(i)}, r_h^{(j)})$, for each request $r_j \in H(m_h^{(i)})$, the closest request $r'_k \in H(m^{(i)}_g)$ can be found from another malware sample $m^{(i)}_g \in C_i$, and $r'_k$ can be added to the pool $p_j$. This can be repeated for all malware $m_g^{(i)} \in C_i$, where $g \neq h$. After this process is complete, and pool $p_j$ has been constructed with HTTP requests, the same process can be followed to construct additional pools $p_{j' \neq j}$, starting from request $r_j \in H(m_h^{(i)})$, until all pools $p_j$ (where $j=1, \ldots l_i$) have been constructed.

Once the pools have been filled with HTTP requests, a signature $s_j$ can be extracted from each pool $p_j$, using a Token Subsequences algorithm. A Token Subsequences signature can be an ordered list of invariant tokens (e.g., substrings that are in common to all the requests in a request pool p). Therefore, a signature $s_j$ can be written as a regular expression of the kind t1.*t2.* . . . *tn, where the t's are invariant tokens that are common to all the requests in the pool $p_j$. For example, the example (a) of FIG. 6 illustrates a network signature where t1="GET/", t2="/command\.php\?id=1"., t3="&version=", and t4="&cc=". The plain text version (b) of FIG. 6 illustrates how the signature looks when it has not been separated into tokens. Note that the network signature is the same as the plain text version, except the tokens are divided by the characters ".*". In some embodiments, only the first part of each HTTP request (e.g., the request method and URL) can be considered for signature generation purposes.

As set forth in 410, once a cluster centroid has been computed for each fine-grain cluster, the distance between pairs of centroids $d(S_i, S_j)$ (which also represents the distance between clusters $C_i$ and $C_j$) can be computed. As indicated above, the centroid $S_i = \{s_k\}$, where $k=1, \ldots l_i$, comprises a set of network signatures St. As noted above, a centroid may comprise the following set of two signatures:
GET /tion.*1/test\.txt
GET /sd/0.*ceo\.jpg?id=.*

The distance between pairs of signatures can be determined as follows. For example, $s_i$ can be the signature in example (a) of FIG. 6, and $s'_j$ can be the plain text version of the invariant tokens in signature $s_j$ (e.g., (b) of FIG. 6). The distance between two signatures $s_i$ and $s_j$ can be defined as:

$$d(s_i, s_j) = \frac{agrep(s_i, s'_j)}{length(s'_j)} \in [0, 1]$$

where agrep $(s_i, s'_j)$ can be a function that performs approximate matching of regular expressions of the signature $s_i$ on the string $s'_j$, and returns the number of encountered matching errors; and $length(s'_i)$ can be the length of the string $s'_i$. It should be noted that approximate matching can be a defined difference between signatures.

For example, consider the following two signatures:
$s_1$="GET /sd/0.*ceo\.jpg?id=.*" and
$s_2$="GET /sd/0.*Zeo\.jpg?id=.*qt"
If the plain text version of $s_1$ is $s_1$'="GET /sd/0ceo\jpg?id=", and if the plain text version of $s_2$ is $s_2$'="GET /sd/0Zeo.jpgid=qt", the distance is thus $d(s_1, s_2) = 1/22 = 0.045$, because $agrep(s_1, s_2') = 1$, and $length(s_2') = 22$. It should be noted that agrep can be 1 because of the matching error of "c" and "Z". The fact that "qt: is added as additional characters to $s_2$ is not considered a matching error in this particular approximate matching algorithm. It should also be noted that in this particular approximate matching algorithm $d(s_i, s_j)$ is equal to zero when $s_i$ perfectly "covers" (i.e., is more generic than) $s_j$, and tends to one when signatures $s_i$ and $s_j$ are more and more different. Those of ordinary skill in the art will see that any kind of approximate matching algorithm can be used to perform the approximate matching.

For example consider the following signatures:
$s_1$="GET /sd/0.*ceo\.jpg?id=.*"
$s_2$="GET /sd/0.*Zeo\.jpg?id=.*qt"
$s_3$="POST /index.html"
In this case $d(s_1, s_2) = 1/22 = 0.045$, whereas $d(s_1, s_3) = 13/22 = 0.8125$.

Given the above definition of distance between signatures, the distance between two centroids (i.e., two clusters) can be defined as the minimum average distance between two sets of signatures. Thus, $$d(C_i, C_j) = d(S_i, S_j) = \min\left\{\frac{1}{l_i}\sum_i^{l_i} \min_j\{d(s_i, s_j)\}, \frac{1}{l_j}\sum_j^{l_j} \min_i\{d(s_j, s_i)\}\right\}$$

where $s_i \in S_i$, $s_j \in S_j$, and $l_i$ and $l_j$ represent the number of signatures in centroid $S_i$ and centroid $S_j$, respectively. It should be noted that when computing the distance between two centroids, only signatures sk for which length $(s'_k) \geq \lambda$ are considered, in order to avoid applying the agrep function on short signatures. Here, $s'_k$ again the plain text version of $s_k$, length $(s'_k)$ is the length of the string $s'_k$, and $\lambda$ is a predefined length threshold (e.g., $\lambda=10$). The threshold $\lambda$ can be chosen to avoid applying the agrep function on short, and sometimes too generic signatures that would match most HTTP requests (e.g., $s_k$=GET /.*), and would thus artificially skew the distance value towards zero.

As set forth in 415, once the cluster merging distance is found, the single-linkage hierarchical clustering algorithm can be applied in combination with the DB validity index to find groups of clusters (or meta-clusters) that are close to each other. Thus, as with the example FIG. 9 dendrogram and dendrogram cut, the DB index can be applied to each height h, and the dendrogram can be cut at the lowest value for DB(h) to find the best cluster merging.

The clusters that are grouped together by the hierarchical clustering algorithm can then be merged to form one larger cluster of malware samples that share similar HTTP traffic behavior. For example, it can be assumed that clusters $C_1 = \{o_8, o_3, o_5\}$, $C_2 = \{o_4, o_7, o_1\}$, and $C_3 = \{o_2, o_9, o_6\}$ have been obtained from the meta-clustering process. In this case, the objects $o_1$, $o_2$, etc., can represent clusters of malware, and the clusters $C_1$, $C_2$, and $C_3$ can be meta-clusters (i.e., clusters of clusters). At this point, we can merge $o_8$, $o_3$, and $o_5$ to obtain a new cluster of malware $O_{m1}$, then we can merge $o_4$, $o_7$, and $o_1$ to obtain a new cluster of malware $O_{m2}$, and merge $o_2$, $o_9$, and $o_6$ to obtain a new cluster of malware $O_{m3}$.

The HTTP traffic generated by the malware samples in each meta-cluster can then be used as input to an automatic network signature generation algorithm, as explained below.

Extract Network Signatures from Clusters.

As set forth above, in 210, the HTTP traffic generated by the malware samples M in the same cluster can be processed by extracting network signatures. Thus, once clusters are found that share similar HTTP behavior, for each of these clusters $C'_i$ (where i=1 . . . c), an updated centroid signature set $S'_i$ can be computed using the same algorithm used for computing cluster centroids. As mentioned above, when extracting the signatures, only the HTTP request method and complete URL can be considered, as shown in (a) of FIG. 6. Also, as with the clustering process, the server name or IP do not need to be considered when generating network signatures.

Filter Out Network Signatures that May Generate False Alarms.

As set forth above, in 212, network signatures that may generate false alarms can be filtered out. After the network signatures are generated, and before the network signatures are deployed, filtering can be done to minimize the probability that the deployed signatures will generate false alarms. To this end, a network signature pruning process can be performed.

Given a set of network signatures S, each signature s in S can be matched against a set D of real URLs that are considered to be legitimate. The set D can be collected from live network traffic. In some embodiments, the set D can be collected in a privacy preserving way. This can be done because URLs sometimes embed personal information such as login names and passwords. Therefore, is some embodiments, collecting an storing such types of URLs can be avoided.

Figure 8:
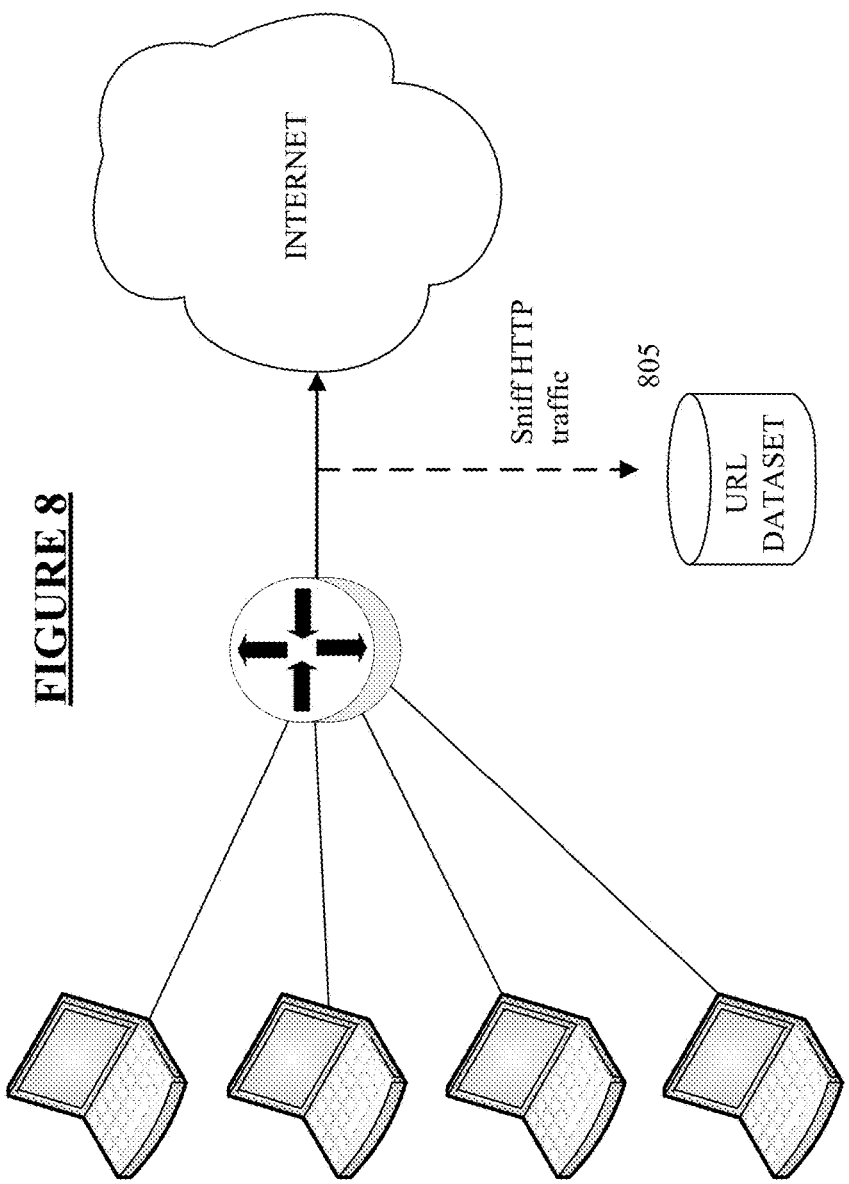

For example, if a URL U is represented by the portion of the following address highlighted in bold:

http:www.damballa.com/overview/index.php then U="/overview/index.php". When monitoring network traffic at the edge of a network, as shown by 805 in FIG. 8, there can be multiple hosts that query U during a certain period of observation (e.g., 1 day). A privacy-preserving URL collection method, which can take into account the observation that if U is queried by more than K different hosts, U will not usually embed any host-specific (and therefore potentially person-specific) information. In other words, U will likely not be able to be used to identify private information related to one specific person, and thus U can be regarded as anonymous.

In some embodiments, a privacy-preserving URL collection algorithm (Algorithm 1) can be used:

---
Algorithm 1
---
function CollectURLs(S, K):
    input: S = {(SrcIP, U)$_i$}$_{i=1..n}$ // S is a set of tuples (SrcIP, U), where U is a URL and SrcIP is the IP address of the hosts that queried for U
    input: K // the threshold on the number of different hosts that should lookup U, before U is stored
    output: A = {U$_j$}$_{j=1..m}$ // A is a set of anonymous URLs
    BU = new CountingBloomFilter( )
    BS = new BloomFilter( )
    for each s in S do:
        c = BU.contains(s.U) // returns a counter c of how many times we ---
Algorithm 1
---
saw s.U
        if c >= K then:
            A.add(s.U)
        else
            str = concat(s.SrcIP,s.U) // concatenates strings s.SrcIP and s.U.
            if not BS.contains(str) then:
                BS.insert(str)
                BU.increment(s.U) // increments the counter for s.U (set to 1 if s.U was not previously in BU).
            end
        end
    end
    return A
    /* end of function */

Algorithm 1 above can thus put the Us where the number of different source IPs from which those particular Us were queried was greater than or equal to a certain number K (e.g., 3), in the set A. The set A, which can represent likely anonymous URLs, can be stored and used for D.

For example, if a network of eight machines is being monitored, and each machine has a different IP address in the range from 10.0.0.1 to 10.0.0.8, the machines in the monitored network could visit certain URLs in the following sequence:

10.0.0.1 /index.php?page=3&version=0.1
10.0.0.1 /login.php?user=bob&password=superman
10.0.0.3 /index.html
10.0.0.2 /sport_cars.html
10.0.0.4 /index.html
10.0.0.2 /index.php?page=3&version=0.1
10.0.0.5 /index.html
10.0.0.2 /index.php?page=3&version=0.1
10.0.0.6 /index.php?page=3&version=0.1
10.0.0.7 /login.php?user=jean&password=batman
10.0.0.8 /login.php?user=jack&password=spiderman
10.0.0.5 /index.html
10.0.0.6 /funny_movie.mov If we set K=3, Algorithm 1 can produce the following URLs for D:
/index.php?page=3&version=0.1
/index.html This can be because "/index.php?page=3&version=0.1" was queried by three different IPs, namely {10.0.0.1, 10.0.0.2, 10.0.0.6}, and "/index.html" was also queried by three different IPs, namely {10.0.0.3, 10.0.0.4, 10.0.0.5}.

In other embodiments, another algorithm (Algorithm 2) can be used to collect a higher number of likely anonymous URLs. As background for one reason why Algorithm 2 can be used to collect a higher number of likely anonymous URLs, the following example can be considered. If two clients query for the following URLs:

CLIENT-1: GET /login.php?user=bob&password=superman
CLIENT-2: GET /login.php?user=jean&password=batman because the above URLs are different, they would not be aggregated and counted towards meeting the threshold K in Algorithm 1. Therefore, the URLs would be regarded as "private" and not used in D. However, the structure of these two URLs is the same. That is, by eliminating the parameter values from the URLs above, the same structure for both can be obtained, as follows:

CLIENT-1: GET /login.php?user=&password=
CLIENT-2: GET /login.php?user=&password=

Thus, in order to collect both anonymous URLs and anonymous URL structures, the following algorithm (Algorithm 2) can be used:

---
Algorithm 2
---
```
function ExtendedCollectURLs(S, K):
   input: S = {(SrcIP, U)_j}_{j=1..n} // S is a set of tuples (SrcIP, U), where U
is a URL and SrcIP is the IP address of the hosts that queried for U
   input: K // the threshold on the number of different hosts that should
lookup U, before U is stored
   output: A = {U_j}_{j=1..m} // A is a set of anonymous URLs and URL
structures
   S' = S
   for each s in S do:
      U' = extractURLStructure(s.U) // extracts the structure of URL s.U
      s' = (s.IP, U')
      S'.add(s')
   end
   return CollectURLs(S', K)
/* end of function */
```
---

Algorithm 2 above can thus put the Us where the number of different source IPs from which the structure of those particular Us were queried was greater than or equal to a certain number K, in the set A. As indicated above, the set A, which can represent likely anonymous URLs, can be stored and used for D.

For example, similar to the example of Algorithm 1, if a network of eight machines is being monitored, and each machine has a different IP address in the range from 10.0.0.1 to 10.0.0.8, the machines in the monitored network could visit certain URLs in the following sequence:
10.0.0.1 /index.php?page=3&version=0.1
10.0.0.1 /login.php?user=bob&password=superman
10.0.0.3 /index.html
10.0.0.2 /sport_cars.html
10.0.0.4 /index.html
10.0.0.2 /index.php?page=3&version=0.1
10.0.0.5 /index.html
10.0.0.2 /index.php?page=3&version=0.1
10.0.0.6 /index.php?page=3 &version=0.1
10.0.0.7 /login.php?user=jean&password=batman
10.0.0.8 /login.php?user=jack&password=spiderman
10.0.0.5 /index.html
10.0.0.6 /funny_movie.mov
If we set K=3, Algorithm 2 can produce the following URLs for D:
/index.php?page=3&version=0.1
/index.html
/login.php?user=&password=
This can be because the following three requests:
10.0.0.1 /login.php?user=bob&password=superman
10.0.0.7 /login.php?user=jean&password=batman
10.0.0.8 /login.php?user=jack&password=spiderman
have the same structure, and therefore it turns out that the URL structure
"/login.php?user=&password=" was queried by at least K=3 source IPs, namely {10.0.0.1, 10.0.0.7, 10.0.0.8}. Therefore, Algorithm 1, which can be called internally by Algorithm 2, can consider these URLs as anonymous, and can add them to D. It should be noted that the URL structures that are searched can be set up by a user that sees a pattern and creates the URL structure based on the pattern. In some embodiments, this process could be automated.

It should also be noted that, in some embodiments, Algorithm 1 and Algorithm 2, or any combination of these algorithms, can also be utilized.

Deploy Network Signatures to Detect Malicious HTTP Requests.

As set forth above, in 215, the network signatures can be deployed (e.g., using intrusion detection system 130) to detect malicious outbound HTTP requests, which are a symptom of infection.

It should be noted that some malware samples may contact malicious websites (e.g., the C&C server of a botnet) as well as legitimate websites (e.g., a search engine such as yahoo.com or msn.com). Therefore, some of the signatures $s'_k \in S'_i$, which are extracted from the HTTP traffic generated by malware samples in cluster $C'_i$ may fortuitously match legitimate HTTP requests, thus generating false positives. In some embodiments, it can be assumed that there is no a priori information relating to why some malware try to contact a legitimate website, and thus it can be hard to apply simple traffic prefiltering (e.g., using domain name whitelisting). For example, some malware may contact yahoo.com to actually perpetrate part of their malicious actions, using very specific search queries that are rare, or may not be seen at all in legitimate traffic. Therefore, prefiltering all the HTTP requests to yahoo.com may not be a good because information (e.g., HTTP requests are signatures) that are specific to certain malware families could be discarded.

In order to solve this problem, instead of using prefiltering of the HTTP traffic towards legitimate websites, a post-filtering signature pruning process can be applied. Given a set of signatures (e.g., a cluster centroid) $S'_i$, the signatures $s'_k \in S'_i$ can be matched against a large dataset of legitimate HTTP requests. The signatures that generate any alert can be filtered out, and only the signatures that do not match any legitimate HTTP request can be kept to form a pruned signatures set $S''_i$. The pruned signature set $S''_i$ can then be deployed into intrusion detection system 130 to identify compromised machines within the monitored network with a very low false positive rate. For example, the signatures:
$s_1$="GET /sd/0.*ceo\.jpg?id=.*"
$s_2$="GET /sd/0.*Zeo\.jpg?id=.*qt"
$s_3$="POST /malware.html"
can be deployed in intrusion detection system 130 to detect malicious traffic. The intrusion detection system 130 can run searches for the signatures in order to determine traffic that has the signatures, identify machines that are sending the traffic, and thus identify compromised machines.

Perform Clustering Validation to Determine how Well Clustering was Done.

In some embodiments, it can be desirable to analyze the clustering results by quantifying the level of agreement between the obtained clusters and the information about the clustered malware samples given by different anti-virus (AV) scanners. At least one AV label graph, which can utilize at least one cohesion index and at least one separation index, can be used, as described below.

AV Label Graphs.

AV label graphs can map the problem of measuring cohesion (or compactness) and separation of clusters in terms of graph-based indexes (i.e., a cohesion index and a separation index). Both cohesion and separation can be measured in terms of the agreement between the labels assigned to the malware samples in a cluster by multiple AV scanners. In practice, the cohesion of a cluster can measure the average similarity between any two objects in the cluster, and can be maximized when the AV scanners consistently label the malware samples in a cluster as belonging to the same family (although different AVs may use different labels, as explained below.) On the other hand, the separation between two clusters $C_i$ and $C_j$ can measure the average label distance between malware belonging to $C_i$ and malware belonging to $C_j$, and can give an indication about whether the malware samples in the two clusters were labeled by the AV scanners as belonging to different malware families or not. The clusters generated by the behavioral clustering can have maximum cohesion and be well separated at the same time, in one embodiment. It should be noted, however, that since the AV labels themselves are not always consistent, the measures of cluster cohesion and separation may give only an indication of the validity of the clustering results. The cluster cohesion and separation indexes can be devised to mitigate possible inconsistencies among AV labels. Thus, the system can be a tool for analyzing and comparing the results of malware clustering systems with traditional AV labels.

Figure 7:
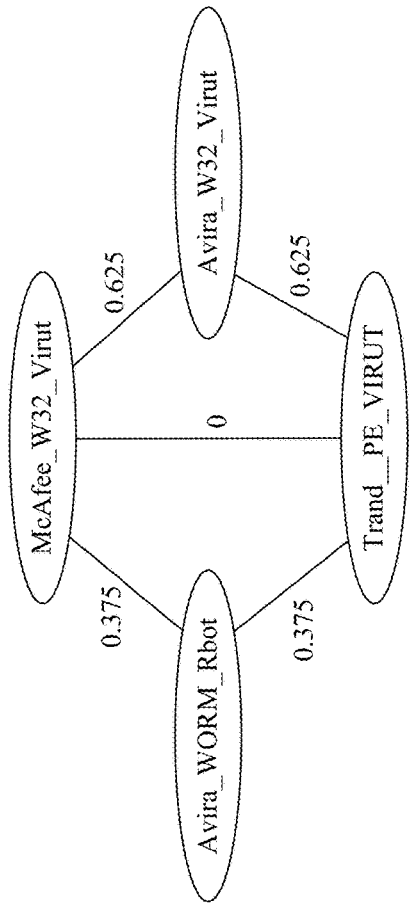

FIG. 7 illustrates an example of how to construct an AV label graph given a cluster of malware samples. Section (a) of FIG. 7 illustrates a malware cluster which contains eight malware samples (one per line). Each line reports the MD5 hash of a malware sample, and the AV labels assigned to the sample by three different AV scanners: McAfee, Aviri, and Trend Micro. From this malware cluster, the following AV label graph can be constructed as follows:

1. A node can be created in the graph for each distinct AV malware family label. A malware family label can be identified by extracting the first AV label substring that ends with a "." character. For example, the first malware sample of portion a of FIG. 7 can be classified as belonging to the W32/Virut family by McAfee, WORM/Rbot by Avira, and PE-VIRUT by Trend Micro. Therefore, three nodes in the AV label graph of (b) of FIG. 7 can be created called: McAfee_W32_Virut, Avira_WORMRbot, and Trent_PE_VIRUT. If a malware sample is missed (not detected) by an AV scanner, this information can be mapped into a special null label. For example, if Avira did not detect the last malware sample (e.g., W32/Virut) from (a) in FIG. 7, a node called Avira_null could be added to the AV label graph in (b) of FIG. 7, and it could be connected to nodes McAfee_W32-Virut and Trend_PE_VIRUT.

2. Once all the nodes have been created for all the malware samples (e.g., all the malware samples in portion a of FIG. 7), the nodes can be connected using weighted edges. Two nodes can be connected with an edge only if the related two malware family labels (e.g., the name of the nodes) appear together in a least one of the lines of (a) in FIG. 7 (e.g., for at least one sample).

3. A weight equal to 1−(m/n) can be assigned to each edge, where m represents the number of times the two malware family labels connected by the edge have appeared on the same line in the cluster (e.g., for the same malware sample) and n is the total number of samples in the cluster (e.g., n=8 in the example in FIG. 7a).

As seen from FIG. 7b, the nodes Mcafee_W32_Virut and Trend_PE_VIRUT are connected by an edge with weight equal to zero. This is because both McAfee and Trend Micro consistently classify each malware sample in the cluster as W32/Virut and PE-VIRUT, respectively (i.e., m=n). On the other hand, the edge between nodes McAfee_W32_Virut and Avira_W32_Virut, for example, can be assigned a weight equal to 0.625 because in this case m=3.

An AV label graph can be an undirected weighted graph. For example, given a malware cluster $C_i = \{m_k^{(i)}\}$ (where k=1 ... $c_i$, if $\Gamma_i = \{L_1 = (l_1, \ldots, l_v)_1, \ldots, L_{c_i} = (l_1, \ldots, l_v)_{c_i}\}$) can be a set of label vectors, where label vector $L_h = (l_1, \ldots, l_v)_h$ is the set of malware family labels assigned by v different AV scanners to malware $m_h^{(i)} \in C_i$. The AV label graph $G_i = \{V_k^{(i)}, E_{k_1,k_2}^{(i)}\}$, where k=1 ... l, can be constructed by adding a node $V_k^{(i)}$ for each distinct malware family label $l_k \in \Gamma_i$. Two nodes $V_{k_1}^{(i)}$ and $V_{k_2}^{(i)}$ can be connected by a weighted edge $E_{k_1,k_2}^{(i)}$ if the malware family labels $l_{k_1}$ and $l_{k_2}$ related to the two nodes appear at least once in the same label vector $L_h \in \Gamma_i$. Each edge $E_{k_1,k_2}^{(i)}$ can be assigned a weight w=1−(m/c$_i$), where m is equal to the number of label vectors $L_h \in \Gamma_i$ containing both $l_{k_1}$ and $l_{k_2}$, and $c_i$ is the number of malware samples in $C_i$.

Cohesion Index.

The cohesion index can be defined as follows: Given a cluster $C_i$, let $G_i = \{V_k^{(i)}, E_{k_1,k_2}^{(i)}\}$ (where k=1 ... l) be the AV label graph, and $\delta_{l_1,l_2}$ be the shortest path between two nodes $V_{l_1}^{(i)}$ and $V_{l_2}^{(i)}$ in $G_i$. If no path exists between the two nodes, the distance can be assumed to be equal to a constant "gap" $\gamma \gg \sup (w_{k_1,k_2})$, where $w_{k_1,k_2}$ is the weight of a generic edge $E_{k_1,k_2}^{(i)} \in G_i$. The cohesion index of cluster $C_i$ can be defined as:

$$C(C_i) = 1 - \frac{1}{\gamma} \frac{2}{n \cdot v(n \cdot v - 1)} \sum_{l_1 < l_2} \delta_{l_1,l_2}$$

where n is the number of malware samples in the cluster, and v is the number of different AV scanners.

For example, if sup $(w_{k_1,k_2})$=1 and $\gamma$=10, the cohesion index $C(C_i) \in [0, 1]$ can be equal to one when each AV scanner consistently assigns the same malware family label to each of the malware samples in cluster $C_i$. Alternatively, the cohesion index can tend to zero if each AV scanner assigns different malware family labels to each of the malware samples in the cluster. For example, the graph in (b) of FIG. 7 has a cohesion index equal to 0.999. The cohesion index is very high because both McAfee and Trend Micro consistently assign the same family label (McAfee_W32_Virut and Trend_PE_VIRUT, respectively) to all samples in the cluster. If Avira also consistently assigned the same family label to all the samples (either always Avira_W32_Virut or always Avira_W32_Rbot), the cohesion index would be equal to one. Thus, regardless of the inconsistency in Avira's labels, because multiple AV scanners are used and the notion of AV label graphs is leveraged, the cluster (a) in FIG. 7 can be correctly considered as very compact.

Separation Index.

The separation index can be defined as follows: Given two clusters $C_i$ and Cj and their respective label graphs $G_i$ and $G_{ii}$, let $C_{ij}$ be the cluster obtained by merging $C_i$ and Cj, and $G_{ij}$ be its label graph. By definition, $G_{ij}$ will contain all the nodes $V_k^{(i)} \in G_i$ and $V_h^{(j)} \in G_j$. The separation index $S(C_i, Cj)$ between $C_i$ and Cj can be defined as:

$$S(C_i, C_j) = \frac{1}{\gamma} avg_{k,h}\{\Delta(V_k^{(i)}, V_h^{(j)})\}$$

where $\Delta(V_k^{(i)}$ and $V_h^{(j)})$ can be the shortest path in $G_{ij}$ between nodes $V_k^{(i)}$ and $V_h^{(j)}$, and $\gamma$ is the "gap" described above with respect to the cohesion index.

It should be noted that the separation index can take values in the interval [0, 1]. For example, $S(C_i, Cj)$ can be equal to zero if the malware samples in clusters $C_i$ and Cj are all consistently labeled by each AV scanner as belonging to the same malware family. Higher values of the separation index can indicate that the malware samples in $C_i$ and Cj are more and more diverse in terms of malware family labels, and can be perfectly separated (i.e., $S(C_i, C_j)=1$) when no intersection exists between the malware family labels assigned to malware samples in $C_i$, and the ones assigned to malware sample Cj.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments.

In addition, it should be understood that the figures described above, which highlight the functionality and advantages of the present invention, are presented for example purposes only. The architecture of the present invention is sufficiently flexible and configurable, such that it may be utilized in ways other than that shown in the figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

It should also be noted that the terms "a", "an", "the", "said", etc. signify "at least one" or "the at least one" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A computerized method for detecting at least one malicious Hypertext Transfer Protocol (HTTP) request based on behavioral clustering of malware samples, comprising:
   collecting information about at least one HTTP request from malware samples in a controlled computer environment for a predetermined time;
   clustering, the malware samples into at least one cluster based on structural similarities among a plurality of the HTTP requests, the structural similarities comprising similarities between: a request method, Uniform Resource Locator (URL) path, URL page name, a parameter name, and a parameter value;
   applying a single-linkage hierarchical clustering algorithm and a Davies-Bouldin (DB) cluster validity index to create a plurality of clusters;
   merging together two or more of the plurality of clusters into meta clusters based on at least one HTTP behavior of each of the two or more of the plurality of clusters;
   extracting network signatures from the information about the at least one HTTP request for each at least one cluster, the network signatures being indicative of malware infection; and
   detecting at least one malicious HTTP request based on at least one of the extracted network signatures.

2. The method of claim 1, further comprising clustering the malware samples into coarse-grain clusters based on statistical features extracted from the malicious HTTP request of the malware samples.

3. The method of claim 2, further comprising finding a fine-grain distance between malware samples.

4. The method of claim 3, further comprising applying a single-linkage hierarchical clustering algorithm and a Davies-Bouldin (DB) cluster validity index to split each coarse-grain cluster into fine-grain clusters based on structural features.

5. The method of claim 4, wherein the merging together of the clusters comprises:
   defining a cluster centroid for each of the fine-grain malware clusters;
   defining distances between cluster centroids; and
   grouping together malware samples that are very close to each other based on the determined distances.

6. The method of claim 5, further comprising using the information about the at least one HTTP request generated by the malware samples in each meta-cluster as input to an automatic network signature generation algorithm.

7. The method of claim 6, further comprising extracting network signatures from the malware samples in meta-clusters.

8. The method of claim 7, further comprising filtering out network signatures that generate false positives.

9. A computerized system for detecting at least one malicious Hypertext Transfer Protocol (HTTP) request based on behavioral clustering of malware samples, comprising:
   a non-transitory device comprising at least one processor configured for:
      collecting information about at least one HTTP request information from malware samples in a controlled computer environment for a predetermined time;
      clustering, using at least one processor, the malware samples into at least one cluster based on structural similarities among a plurality of the HTTP requests, the structural similarities comprising similarities between: a request method, Uniform Resource Locator (URL) path, URL page name, a parameter name, and a parameter value;
      applying a single-linkage hierarchical clustering algorithm and a Davies-Bouldin (DB) cluster validity index to create a plurality of clusters;
      merging together two or more of the plurality of clusters into meta clusters, based on at least one HTTP behavior or each of the two or more of the plurality of clusters;
      extracting, using the at least one processor, network signatures from the information about the at least one HTTP request for each at least one cluster, the network signatures being indicative of malware infection; and
      detecting, using the at least one processor, at least one malicious HTTP request based on at least one of the extracted network signatures.

10. The system of claim 9, wherein the processor is further configured for clustering the malware samples into coarse-grain clusters based on statistical features extracted from the malicious HTTP request of the malware samples.

11. The system of claim 10, wherein the processor is further configured for finding a fine-grain distance between malware samples.

12. The system of claim 11, wherein the processor is further configured for applying a single-linkage hierarchical clustering algorithm and a Davies-Bouldin (DB) cluster validity index to split each coarse-grain cluster into fine-grain clusters based on structural features.

13. The system of claim 12, wherein the merging together of the clusters comprises:
defining a cluster centroid for each of the fine-grain malware clusters;
defining distances between cluster centroids; and
grouping together malware samples that are very close to each other based on the determined distances.

14. The system of claim 13, wherein the processor is further configured for using the information about the at least one HTTP request generated by the malware samples in each meta-cluster as input to an automatic network signature generation algorithm.

15. The system of claim 14, wherein the processor is further configured for extracting network signatures from the malware samples in meta-clusters.

16. The system of claim 15, wherein the processor is further configured for filtering out network signatures that generate false positives.

17. A computerized method for detecting at least one malicious Hypertext Transfer Protocol (HTTP) request based on behavioral clustering of malware samples, comprising:
collecting information about at least one HTTP request from malware samples in a controlled computer environment for a predetermined time;
clustering, the malware samples into at least one cluster based on statistical features among a plurality of HTTP requests, the statistical features comprising: a total number of HTTP requests, a number of GET requests, a number of POST requests, an average length of URLs, an average number of parameters in the request; an average amount of data sent by POST requests, and an average length of the response;
after clustering based on statistical features, clustering, the malware samples into at least one cluster based on structural similarities among the plurality of the HTTP requests;
identify a cluster centroid of each malware cluster;
identify a distance between cluster centroids;
merging together two or more of the plurality of clusters into meta clusters, based on the distance between the two or more cluster centroids;
extracting network signatures from the information about the at least one HTTP request for each at least one cluster, the network signatures being indicative of malware infection; and
detecting at least one malicious HTTP request based on at least one of the extracted network signatures.

* * * * *